May 5, 1964 J. F. CREEDON 3,131,820
AUTOMATIC PARKING SYSTEM
Filed Nov. 10, 1960 17 Sheets-Sheet 1

INVENTOR.
Joseph F. Creedon.
BY
ATTORNEYS.

May 5, 1964  J. F. CREEDON  3,131,820
AUTOMATIC PARKING SYSTEM

Filed Nov. 10, 1960  17 Sheets—Sheet 2

INVENTOR.
Joseph F. Creedon.
BY
ATTORNEYS

May 5, 1964     J. F. CREEDON     3,131,820
AUTOMATIC PARKING SYSTEM
Filed Nov. 10, 1960     17 Sheets-Sheet 3

INVENTOR.
Joseph F. Creedon.
BY
ATTORNEYS

May 5, 1964   J. F. CREEDON   3,131,820
AUTOMATIC PARKING SYSTEM
Filed Nov. 10, 1960   17 Sheets-Sheet 4

INVENTOR.
Joseph F. Creedon.
BY
ATTORNEYS.

May 5, 1964 J. F. CREEDON 3,131,820
AUTOMATIC PARKING SYSTEM
Filed Nov. 10, 1960 17 Sheets-Sheet 5

INVENTOR.
Joseph F. Creedon.
BY
ATTORNEYS.

May 5, 1964  J. F. CREEDON  3,131,820
AUTOMATIC PARKING SYSTEM
Filed Nov. 10, 1960  17 Sheets-Sheet 6

INVENTOR.
Joseph F. Creedon.
BY
ATTORNEYS.

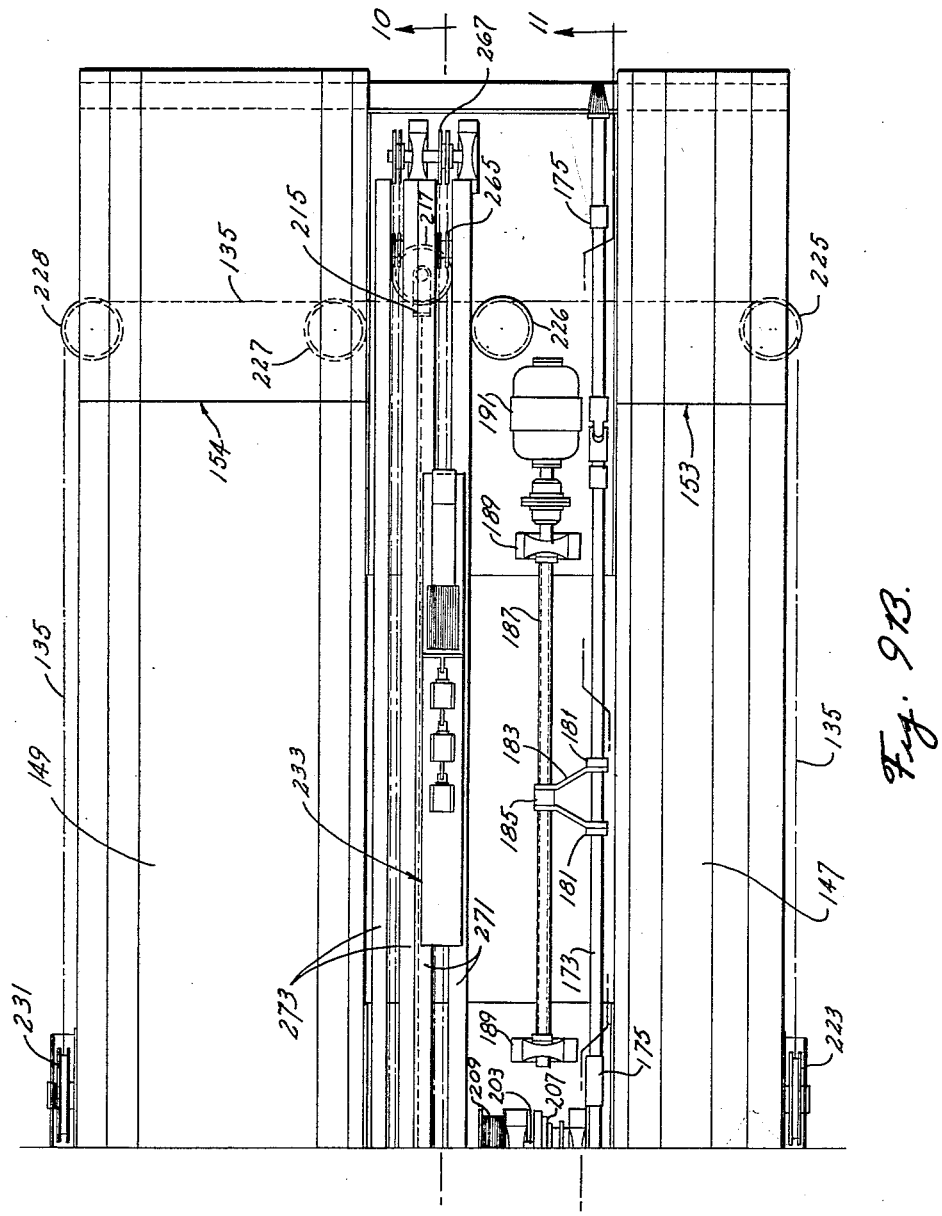

May 5, 1964 J. F. CREEDON 3,131,820
AUTOMATIC PARKING SYSTEM
Filed Nov. 10, 1960 17 Sheets-Sheet 9

INVENTOR.
Joseph F. Creedon
BY
ATTORNEYS.

May 5, 1964 J. F. CREEDON 3,131,820
AUTOMATIC PARKING SYSTEM
Filed Nov. 10, 1960 17 Sheets-Sheet 10
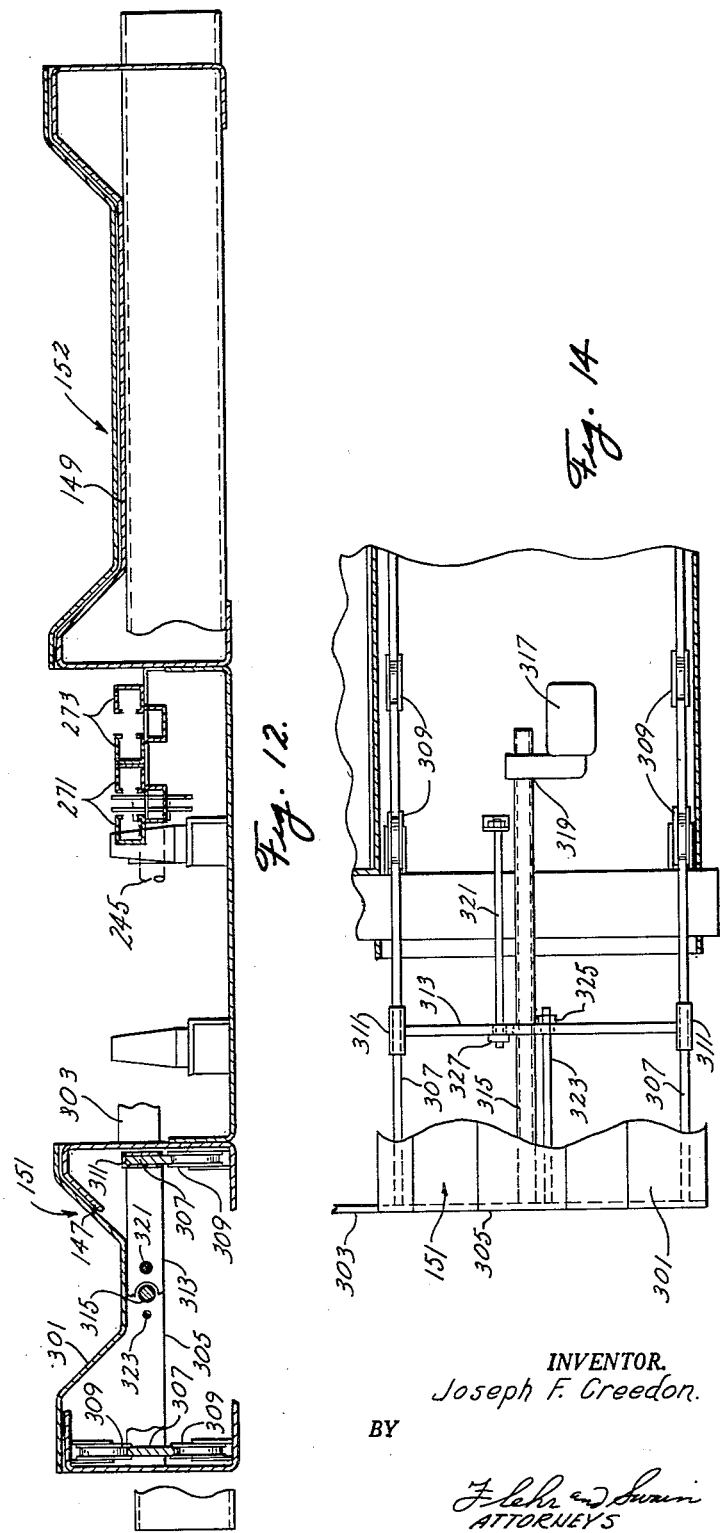
INVENTOR.
Joseph F. Creedon.
BY
ATTORNEYS May 5, 1964  J. F. CREEDON  3,131,820
AUTOMATIC PARKING SYSTEM
Filed Nov. 10, 1960  17 Sheets-Sheet 11

INVENTOR.
Joseph F. Creedon.
BY
ATTORNEYS

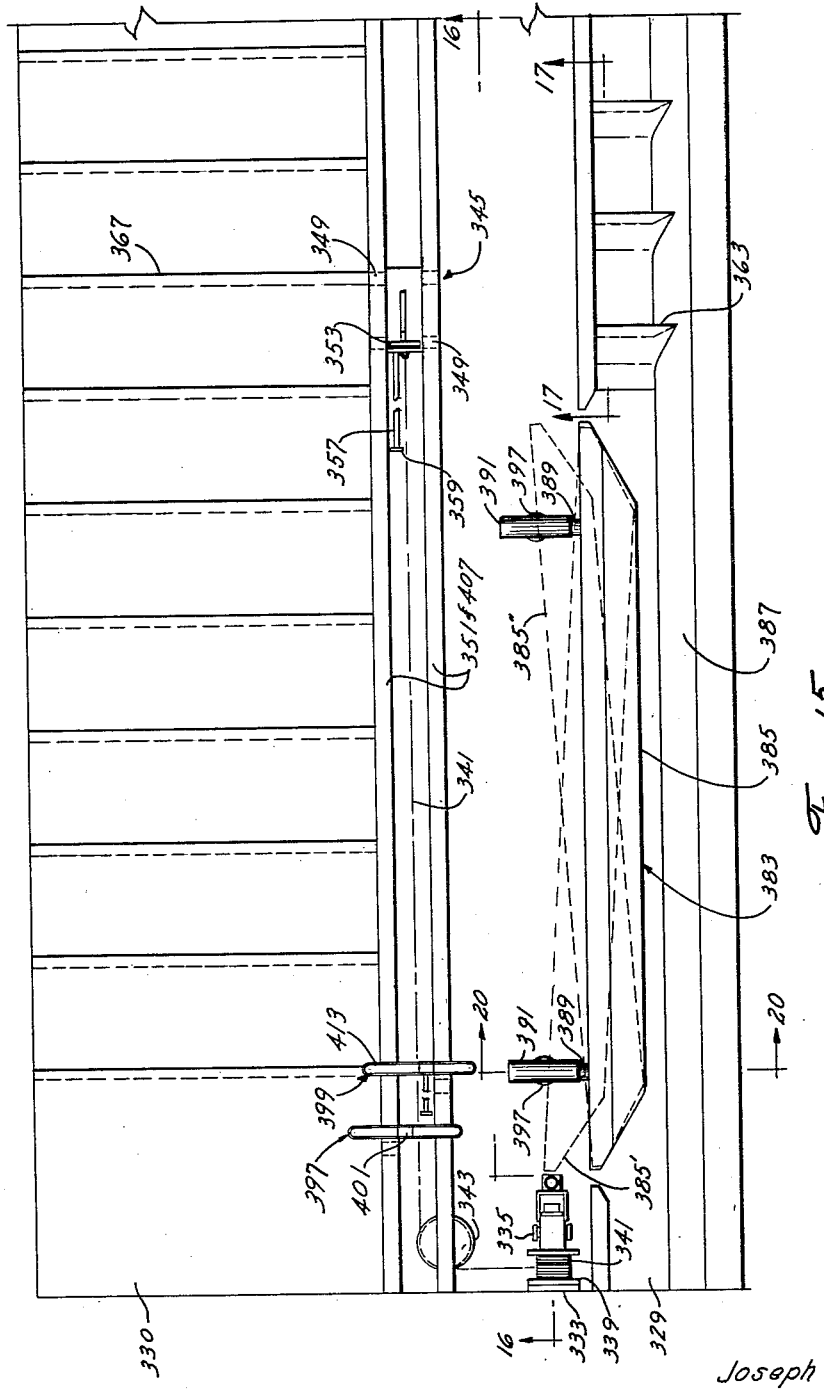

INVENTOR.
Joseph F. Creedon.

May 5, 1964 J. F. CREEDON 3,131,820
AUTOMATIC PARKING SYSTEM
Filed Nov. 10, 1960 17 Sheets-Sheet 14

INVENTOR.
Joseph F. Creedon
BY
ATTORNEYS

May 5, 1964 J. F. CREEDON 3,131,820
AUTOMATIC PARKING SYSTEM
Filed Nov. 10, 1960 17 Sheets-Sheet 15

INVENTOR.
Joseph F. Creedon
BY
ATTORNEYS.

May 5, 1964   J. F. CREEDON   3,131,820
AUTOMATIC PARKING SYSTEM
Filed Nov. 10, 1960   17 Sheets-Sheet 16

INVENTOR.
Joseph F. Creedon.
BY
*F. Lehr and Swain*
ATTORNEYS.

May 5, 1964

J. F. CREEDON 3,131,820

AUTOMATIC PARKING SYSTEM

Filed Nov. 10, 1960

INVENTOR.
Joseph F. Creedon.

BY

ATTORNEYS

United States Patent Office 3,131,820
Patented May 5, 1964

3,131,820
AUTOMATIC PARKING SYSTEM
Joseph F. Creedon, 726 Cass St., Monterey, Calif.
Filed Nov. 10, 1960, Ser. No. 68,476
12 Claims. (Cl. 214—16.1)

This invention relates generally to parking systems and more particularly, to parking systems of the garage type capable of automatic operation.

This invention is a continuation-in-part of applicant's copending application, entitled "Parking System," Serial No. 100,769, filed May 26, 1960 (now abandoned).

As is well known, parking in large and even some small cities has, in the past few years, become a relatively extreme problem. On the street parking is often inadequate due to the large number of automobiles in use. Consequently, the parking lot business developed and rapidly advanced in the very limited number of years of its existence. The original parking lots were simply paved open fields or lots whereon a number of cars could be parked. Due to the relatively large amount of space required in these fields, not only for parking the cars but for maneuvering them to and from the parking spaces; and also due to the high cost of property in heavy traffic areas, the development of multi-floor garages received its inception.

In general, these multi-floor garages merely comprise a number of floors one above the other, each being similar to the ground floor, whereon a number of cars may be maneuvered and parked. In order to place cars on the floors above street level, ramps are arranged between the various floors. More recently the ramps have been succeeded by elevators which use considerably less space and thereby provide a capacity for a larger number of parked cars in a given area.

These elevator systems, however, have been limited to one of two types of operation. The first type of operation is such that the elevator merely takes the place of the ramps wherein the automobile is driven off the elevator onto the floor and then maneuvered to a particular parking space under its own power. The second type of operation for elevators is that wherein a single stall is arranged opposite the elevator shaft at each floor level. In these instances it is clear that there are obvious deficiencies.

The use of floor space on the various floors is still not economical since space is required for maneuvering the cars to and from the parking places. The maneuvering space not only requires relatively large areas between the individual parked cars but also requires pathways between the various rows of cars.

It is, therefore, a general object of this invention to provide an improved parking system.

It is a more particular object of this invention to provide a parking system with a highly economical use of available space.

It is another object of this invention to provide a parking system wherein an elevator shaft is disposed between two columns of parked cars, each of which columns may be several cars deep.

It is a still further object of this invention to provide a parking system of the aforementioned character wherein the elevator shaft employs a one-car and a multi-car platform assembly, each of said platform assemblies being foldable to clear the elevator shaft.

It is still a further object of this invention to provide a parking system of the aforementioned character wherein a plurality of sets of the aforementioned multi-car and one-car platform assemblies are incorporated in a single elevator shaft, with the various assemblies being capable of passing each other in the shaft.

It is still another object of this invention to provide a parking system of the aforementioned character wherein the automobile delivery and discharge operations are automatic.

It is still another object of this invention to provide a parking system of the aforementioned character wherein not only the delivery and discharge of automobiles are automatic but also automatic means are provided for computing the parking fee for each individual car.

These and other objects and features of the invention will become more clearly apparent upon a review of the following description in conjunction with the accompanying drawing in which:

FIGURES 9A and 9B are together a plan view of an elevator platform for use in accordance with this invention;

FIGURE 12 is a sectional view taken along the line 12—12 of FIGURE 9A;

FIGURE 14 is a detailed plan view partly broken away of a spanner as used in accordance with this invention;

FIGURE 15 is a plan view of the floor area for storing automobiles in accordance with the invention;

An overall garage incorporating this invention is shown. It is seen that the individual garage includes a plurality of central shafts 11 which separate the parking area into a right hand and a left hand side 13 and 15 respectively. Each side of the parking area is divided into a plurality of floors, lettered $a$, $b$ and $z$; and a plurality of vertical tiers lettered $k$, $l$, $m$ and $n$ thereby providing a matrix of slots for parking cars. The slots on either side of the shafts 11 are in registry with each other. It is clear that any number of tiers or floors may be utilized merely by varying the size of the actual structure.

Each of the slots is divided into stalls lettered $r$, $s$, $t$ on the right hand side and $u$, $v$, $w$ on the left hand side. Thus, a modular arrangement is employed and a three letter designation may be used to define any particular stall within the garage. Thus, the stall lettered $a\ k\ w$ will be that in the lower left hand corner as shown in FIGURE 1.

Figure 1:
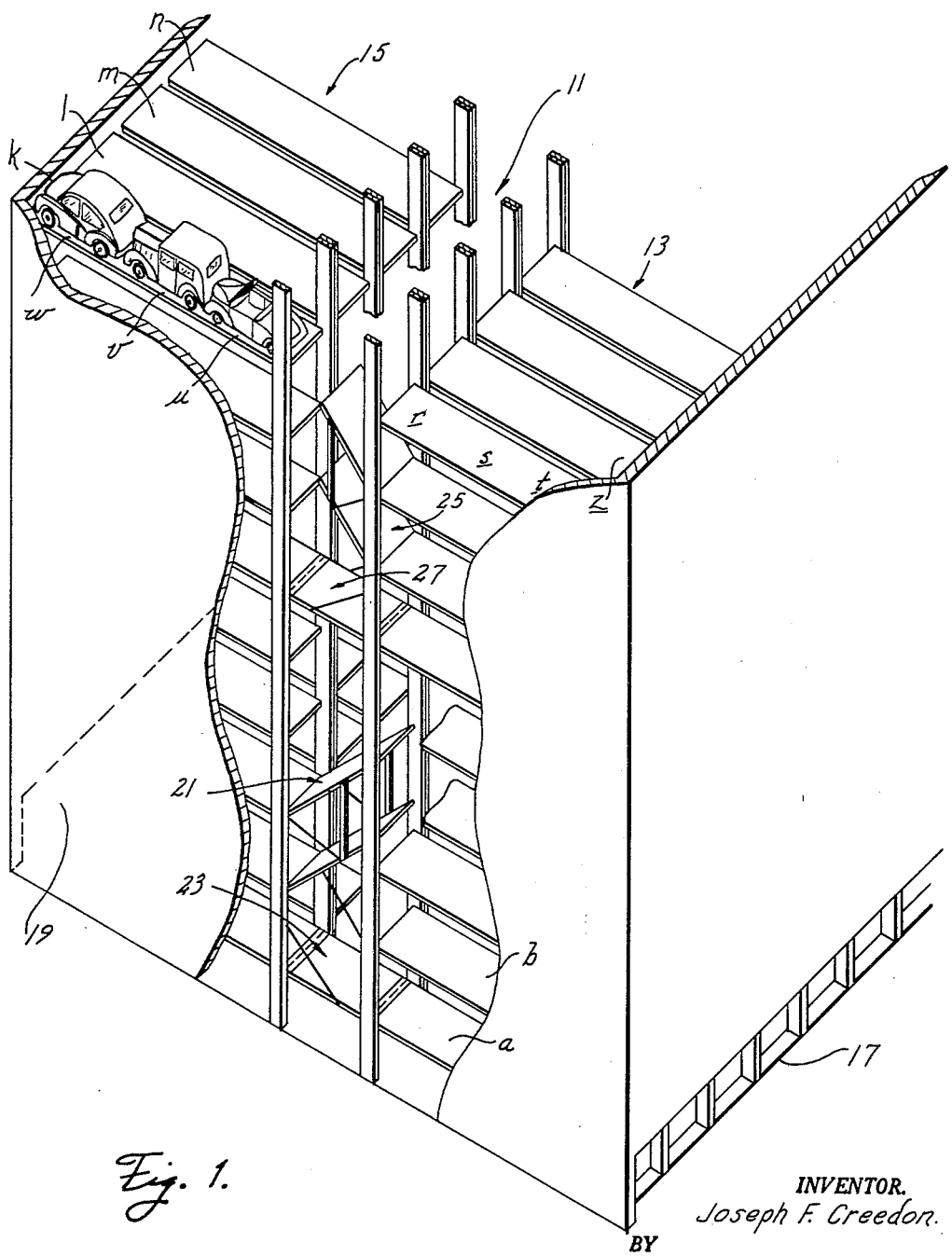
FIGURE 1 is a perspective view of a garage incorporating the automatic parking system of this invention.

The garage shown in FIGURE 1 also includes an entrance 17 and an exit 19 both of which may be, but are not necessarily on the street level.

Each of the central shafts 11 include an elevator system including a plurality of platforms. Thus, in the shaft 11 corresponding to the tier $k$ there is shown a double platform assembly 21 and a single platform assembly 23. If the garage structure includes a particularly large number of floors it may be advisable to utilize a second double and a second single platform assembly.

The facing of the garage is shown to be of concrete. However, it is obvious that any facing may be provided since the structure of the garage itself does not dictate any particular form or covering. In fact, no facing is required at all.

In general terms the operation of the garage is as follows. An automobile to be parked drives through the entrance 17 onto an entrance lane. The entrance lane includes means for moving the car onto one of the platform assemblies into one of the shafts 11. The means for moving the car from the entrance is not particularly explained herein as such; but it may be considered as similar in function and structure to those means which will be hereinafter described in conjunction with the platform assemblies themselves. The particular stall to which the car is to be delivered may be selected from a control panel which can conveniently be located near the entrance and exit. The entrance lanes for the various tiers $k$, $l$, $m$ and $n$, if desired, be separated into two different floors $a$ and $b$ so that alternate lanes may be utilized by customers entering and leaving their cars.

The various platform assemblies serve to deliver cars to the proper floor and upon signal from the control panel to further deliver them into a stall at that floor.

The double platforms may be utilized during rush hour parking for actually delivering cars to and from the stalls. Its more important use, however, is temporary storage of cars parked in the stalls near the shaft while a more remote car is placed on the single platform for delivery to the customer. It is noted that each of the floors and tiers include a plurality of stalls for instance $r$, $s$, $t$ on the right hand side for several cars to be parked in tandem. It is apparent that if the car in stall $t$ is to be removed the cars in stalls $r$ and $s$ must first be removed to provide passage for the desired car. The double platform is used for this purpose. Thus the car in stall $r$ is placed on one platform of the double platform assembly and the car in stall $s$ is placed on the other. Subsequently, the car in stall $t$ is placed on the single platform and delivered to the customer area below.

It is apparent that a larger number of stalls may be provided in each slot. In such instances, instead of double platform assemblies 21 and 25, platform assemblies having a greater number of platforms may be required. Thus, if five stalls are to be used instead of three, the multiple platform assemblies should include four platforms rather than two. Alternatively, additional double platform assemblies may be utilized for the same purpose.

To describe the general nature and structure of the garage, the particular features and structures thereof are described hereinafter.

THE SHAFTS

Platform Drive

Figure 2:
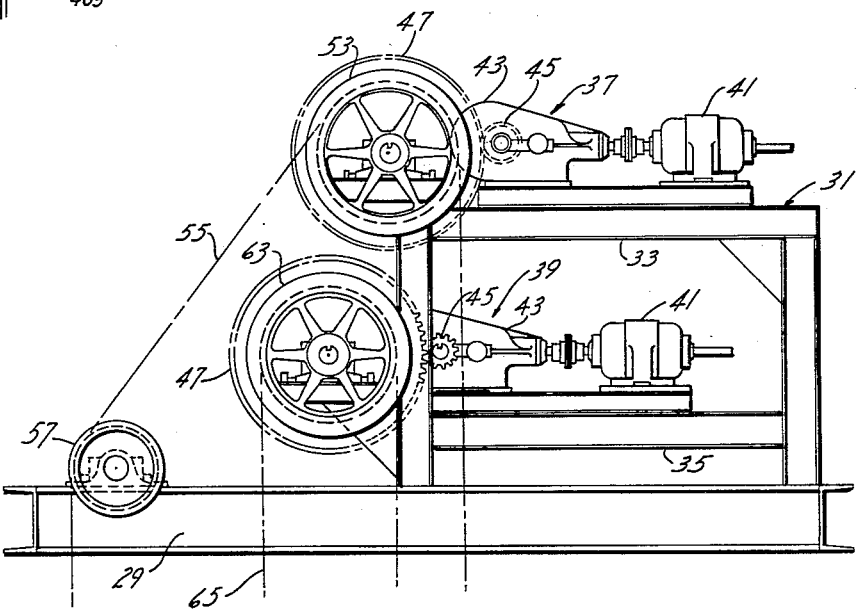
FIGURE 2 is a side elevational view of a drive means for raising and lowering the single and double platforms in accordance with the invention.
Figure 3:
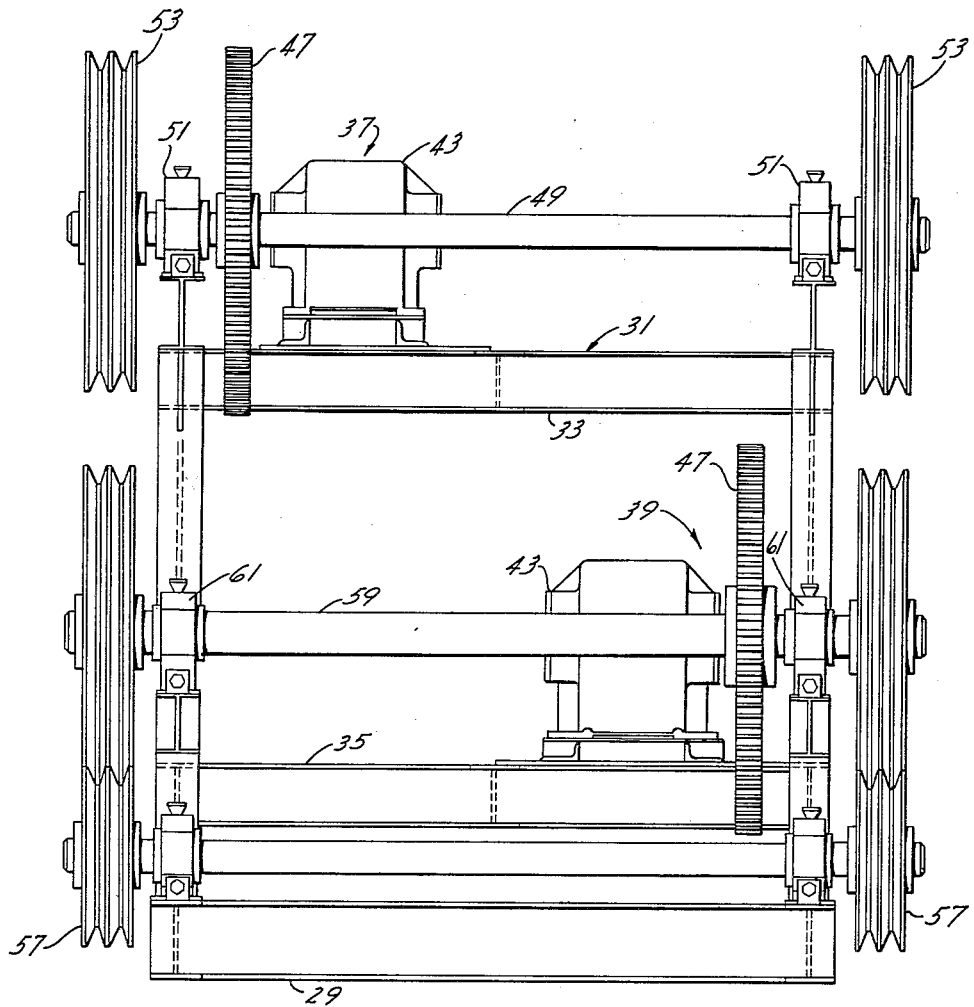
FIGURE 3 is a front elevational view of the drive device shown in FIGURE 2.
Figure 4:
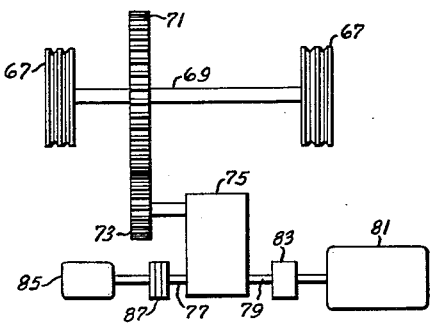
FIGURE 4 is a schematic view of an alternative drive means for raising and lowering the platforms in accordance with the invention.
Figure 5:
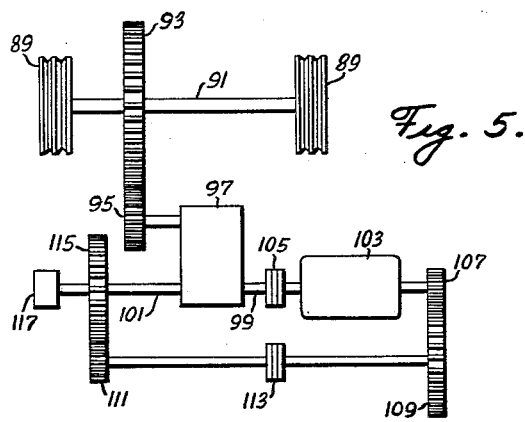
FIGURE 5 is a schematic view of a second alternative of the drive means for raising and lowering the platform.

In any system wherein vertically moveable platforms are utilized, the motive power for the vertical movement is a basic portion of the system. FIGURES 2 and 3 depict one form of drive unit capable of providing the vertical drive for the platform assemblies in accordance with this invention. The schematic representations of FIGURES 4 and 5 show alternative means for providing vertical movement and are designed to provide smoother braking of the platforms and leveling at the desired floor.

Referring more particularly to FIGURES 2 and 3 a drive mechanism or motive unit is shown. The mechanism shown is designed to be situated at the top of each of the shafts 11. The motive unit includes a structural base member 29 which may be fabricated from steel channels. The framework 31 is mounted on the base member 29 and it also may be fabricated from steel channels. The framework 31 includes an upper frame 33 and a lower frame 35 upon which are mounted the motive units 37 and 39 for lifting single and double platforms respectively.

Each of the motive units 37 and 39 includes a motor 41 coupled to a reduction gear system 43 and through the pinions 45 to the bull gears 47.

The bull gear 47 associated with the motive unit 37 is secured to a shaft 49 journaled in the bearings 51. A pair of sheaves 53 are also secured to the shaft 49 for rotation therewith. Cable 55 cooperates with the sheaves 53 and the idler sheaves 57 to vertically move the single platform assembly. That portion of the cable extending over the idler sheaves 57 may be secured to a counter-weight while that portion extending over the sheaves 53 is connected to the single platform assembly.

Bull gear 47 is likewise secured to a shaft 59 which is journaled in the bearings 61. Sheaves 63 are secured to the shaft 59 and cooperate with the cables 65 to vertically move the double platform assembly.

In the embodiment of the motive means shown in FIGURES 2 and 3 the braking and leveling of the platform assemblies depends upon speed control capabilities of the motors 41 themselves. The motive assembly shown in FIGURE 4 may be used as an alternative. In this instance the sheaves 67 are secured to a shaft 69 along with the bull gear 71. The bull gear 71 is driven through a pinion 73 and the reduction gearing assembly 75. The reduction gear assembly includes two input shafts 77 and 79, the latter of which is connected to a motor 81 through a brake assembly 83 which may be of the magnetic type.

The other input shaft 77 is connected to a leveling motor 85 through a clutch assembly 87 which may be of the magnetic type.

In the operation of a motive system as shown in FIGURE 4, means is required at each floor for developing a signal when the platform approaches the desired floor and when it is in registry therewith. It may also be desirable to provide means for indicating when the platform has over-traveled the desired floor.

In such a system the motor 81 is used to drive the bull gear through the reduction gearing 75 and the pinion 73 for the major portion of the platform travel. When the platform approaches the desired floor the brake 83 is activated and begins to slow the motor 81. When the motor 81 is slowed to a predetermined speed the leveling motor 85 may be activated through the magnetic clutch 87 to provide a final small vertical movement of the platforms to the desired floor level. When the elevator reaches the floor level the action of the leveling motor is interrupted and the brake 83 is set. In the event that the platform over travels the desired floor level the leveling motor is reversed to correct the alignment. Thus, it is seen that a smaller motor is utilized to provide accurate alignment of a platform which is driven during the majority of its travel with a heavy duty motor.

FIGURE 5 shows another motor unit which may be used to facilitate leveling of the platforms with the respective floors. Here the sheaves 89 are secured to the shaft 91 along with the bull gear 93, the bull gear is driven by a pinion 95 which is connected to the output of the reduction gear assembly 97. Here again the reduction gear assembly has two input shafts 99 and 101, the former of which is connected to a motor 103 through a magnetic clutch 105. The motor 103 includes a second output shaft connected to a pinion 107 which drives the gear 109. The gear 109 is selectively coupled to another pinion 111 through the magnetic clutch 113. The pinion 111 is meshed with the gear 115 which is coupled to the second input shaft 101 of the reduction gear assembly 97. The brake assembly 117 which may, for instance, be of the magnetic type or the eddy current type is also connected to the shaft 101. It is noted that the shafts 99 and 101 are actually but two extensions of the same shaft connected through the gear reduction assembly. Thus the brake assembly 117 is always available regardless of which input shaft is utilized.

In the operation of the motor unit as shown in FIGURE 5 the clutch 105 may be engaged to connect the motor 113 to the reduction gear assembly 97 and subsequently drive the sheaves 89. At this time the magnetic clutch 113 is disengaged whereby the pinion 111 and the gear 115 rotate freely due to the integral nature of the shafts 99 and 101. When the platform nears the desired floor the magnetic clutch 105 is disengaged and the clutch 113 is engaged whereby power is supplied from the motor 103 through the gear train including the pinions and gears 107, 109, 111 and 115 to drive the reduction gear assembly 97. The purpose of the gear train is merely to reduce the output motion of the motor 103 as applied to the gear reducing assembly 97. Thus, the motor 103 may deliver high speed power to the sheave 89 through the magnetic clutch 105 and low speed power to the same sheave through the magnetic clutch 113. Thus, normal running vertical movement and effective leveling may be accomplished by a single motor. Since a single motor is utilized here the system shown in FIGURE 5 may be considered a preferred embodiment of the motive drive unit.

*Runners for the Platforms*

Referring to FIGURES 1, 6, 7, and 8 the platform runners within the shafts are shown. Each of the columns 11 include vertical pillar members 119 at each corner thereof. The vertical pillar members include a channel 121 in which the double platform assembly rides and a second channel 123 in which a single platform assembly rides. The two channels 121 and 123 are separated by a space 124 which may receive required cables and wiring for the system.

Figure 7:
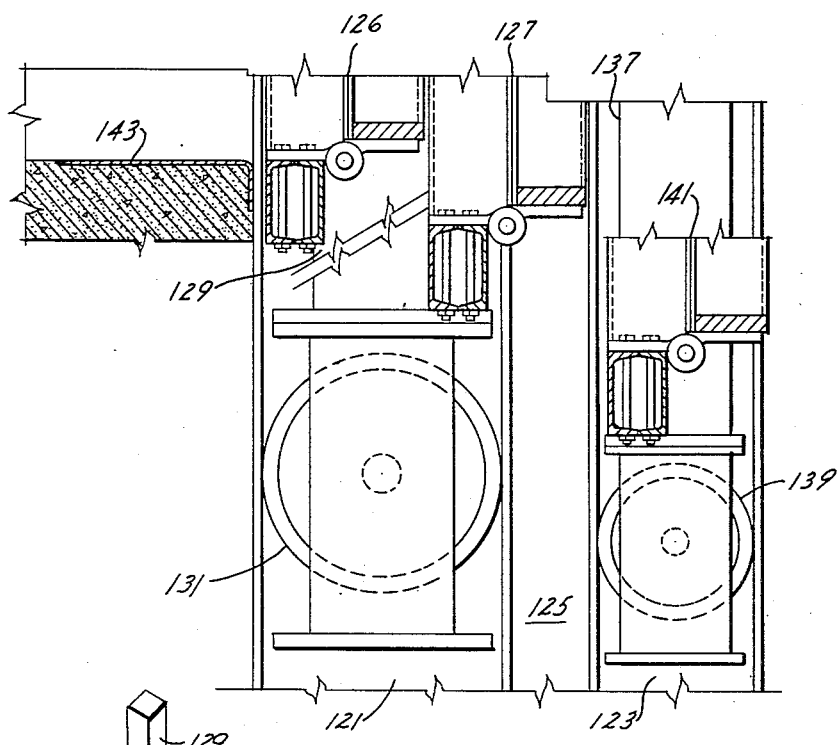
FIGURE 7 is a side elevational view of the shaft partly in section showing the single and double platforms in their vertically folded position.
Figure 8:
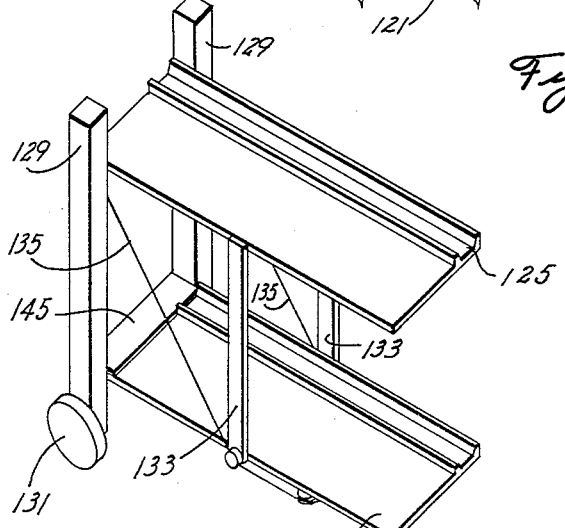
FIGURE 8 is a perspective view of a double platform in accordance with this invention.

As can be seen in FIGURE 8, the double platform assembly includes upper platform 125 and a lower platform 127, each being hinged to vertical support members 129. The vertical support member 129 may include a guide such as the circular member 131 shown in FIGURE 7. Other guide means may be provided at the upper end of the support member. Each of the platforms 125 and 127 are joined by the pivoted braces 133 to provide corresponding action between the two platforms. The cables 135 are secured to the members 129 and serve to fold the platforms 125 and 127 into a vertical position, as will be defined hereinafter.

Figure 6:
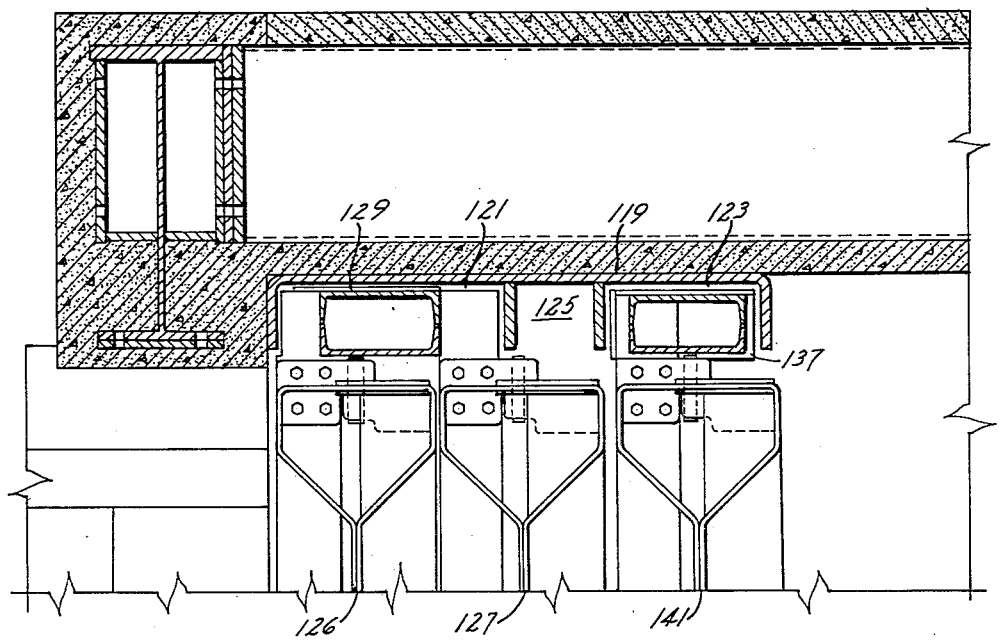
FIGURE 6 is a plan cross sectional view of the elevator shaft in accordance with this invention showing the single and double platforms in a vertically folded position.

The single platform assembly is constructed somewhat similar to the double platform and includes a vertical support member 137 as shown in FIGURES 6 and 7 having a guide member 139 as shown in FIGURES 6 and 7. The single platform assembly includes a platform 141 which, like the double platforms, is hingeably secured to a vertical support member 137. The platform assemblies ride in their respective channels under the motive power produced by the units shown in FIGURES 2, 3 and 5.

It is noted that the platform assemblies, in their vertically folded position, as shown in FIGURES 6 and 7, are horizontally spaced from each other such that each may be independently driven in the vertical direction without regard to the shaft position of the other. Thus, either the single or the double platform assembly may pass the other so long as they are in their vertically folded position. Moreover, the single platform may pass the double platform while merely the double platform is in a folded position.

In FIGURE 7 there is shown a portion of a floor 143 such as one of the floors *a*, *b*, or *z*, as shown in FIGURE 1. It is noted that the upper platform 125 of the double platform assembly is disposed relatively close to the floor portion 143 whereby a car may be moved directly from the platform onto the floor. However, the lower platform 127 if the double platform assembly is considerably more spaced from the floor. To provide relative ease in moving the car from the lower platform 127 to the floor portion 143, a permanent member 145 (FIGURE 8) is secured to the lower portion of the vertical support members 129 adjacent the lower platform 127. Thus, the gap between the lower platform and the floor portion is spanned with the member 145.

It is noted that the single platform 141 is even farther spaced from the floor portion 143. This space is such that cars cannot ordinarily be moved over without bridging support. To provide support the single platform is equipped with a spanner unit as will be described hereinafter.

Moreover, the single platform and each of the double platforms may cooperate not only with the floor portion 143 adjacent to the vertical channel member 119 supporting the platform assemblies, but may also cooperate with floor sections opposite the hinged portions of the platforms. Thus, as viewed in FIGURE 1 either of the platforms may cooperate with either the right hand side 13 or the left hand side 15 of the garage. If a second set of platforms is not to be utilized the length of the platforms 125, 127 and 141 may be chosen such as to span the entire gap to the opposite side of the shafts. However, if additional platform assemblies are to be utilized the channel portions on the opposite side of the shaft must carry the additional assemblies. Here, the platforms 125, 127 and 141 cannot then have sufficient length to span the full distance. Consequently, spanner units are provided on each of the platforms 125, 127 and 141 at their opposite ends for cooperation with the floor opposite the hinged side of the platform. As mentioned before, these spanners will be described more fully hereinafter.

Thus, it is seen that several platform assemblies may be employed in the same shaft and each may cooperate with the various floors in the garage. Moreover, the various platform assemblies may pass each other in the shaft while in their vertically folded position.

*Platform*

Figure 9A:
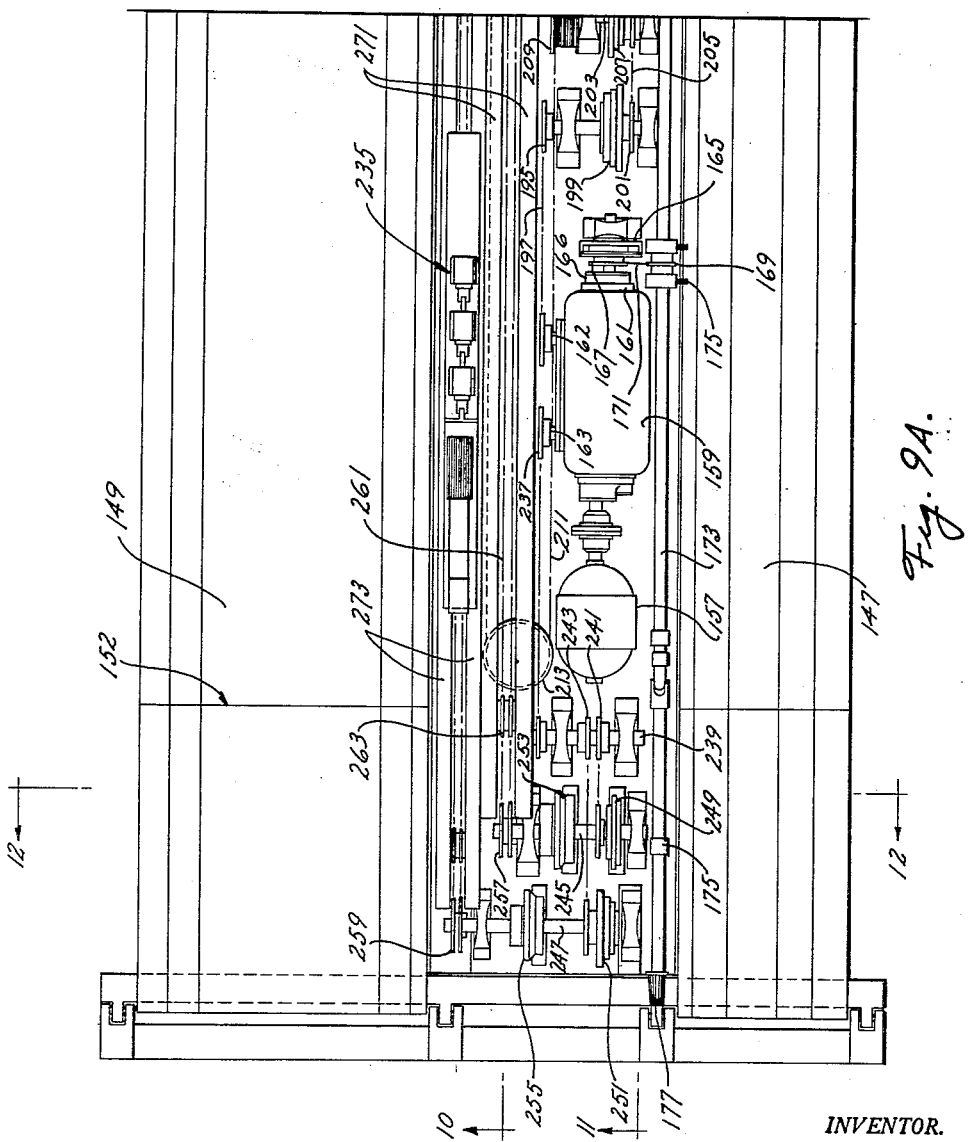
Figure 10A:
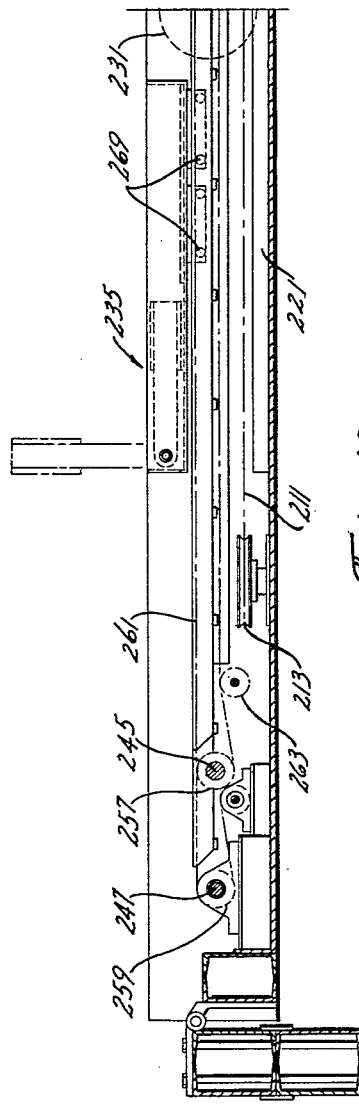
FIGURES 10A and 10B are together a sectional view taken along the lines 10—10 of FIGURES 9A and 9B.
Figure 11A:
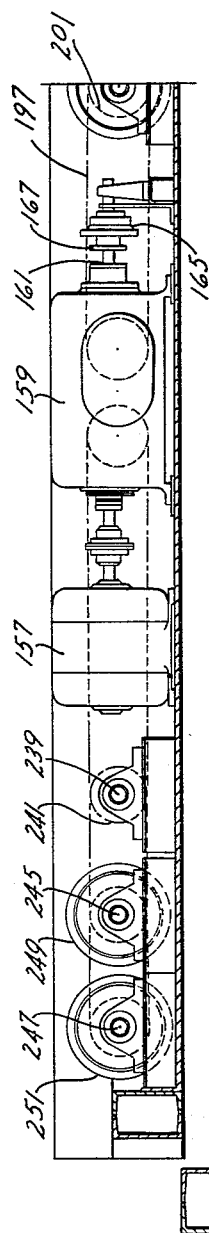
FIGURES 11A and 11B are together a sectional view taken along the lines 11—11 of FIGURES 9A and 9B.
Figure 10B:
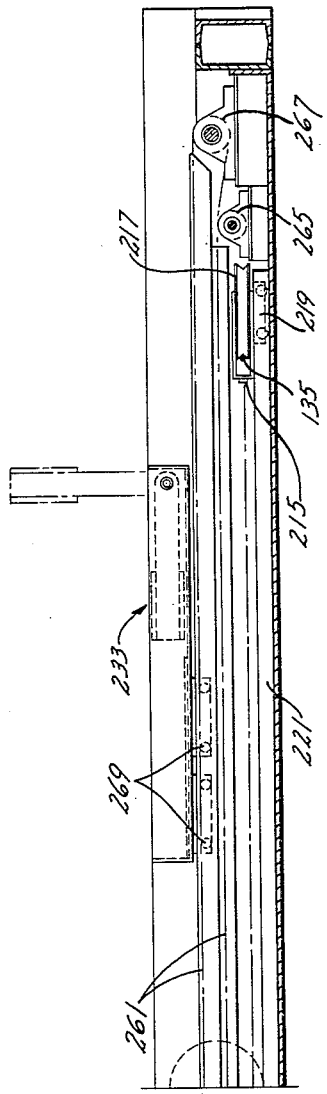
Figure 11B:
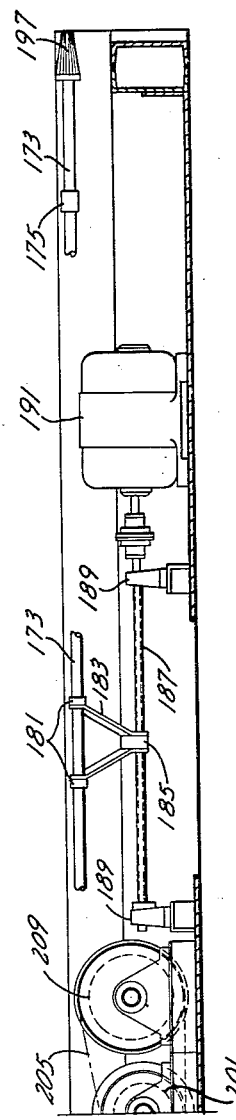

The function of the platforms in this present invention is to carry the car vertically along the shaft 11 and to place it in a particular stall; and subsequently, to receive the car and deliver it to the exit area. A platform to perform this function is shown particularly in FIGURES 9, 10, 11 and 12. It is noted that each of FIGURES 9, 10 and 11 are separated in the section A and B in order to provide sufficient clarity to the particularly elongated members. In the following description it is assumed that each of the FIGURES 9, 10 and 11 are joined along their break lines.

Referring particularly to FIGURES 9 and 12 it is seen that the platform includes a pair of tracks 147 and 149 for automobile tires. It is noted that the track 147 is relatively narrow compared to the track 149 and is also convergent at its lower end thus serving to retain automobile tires of various size. The track 149, on the other hand, is particularly wide so that the platform can accommodate cars having various tire track spacing. In addition to the tracks 147 and 149 the platforms include spanner units 151 to 154 which overlie the tracks at each end and serve to bridge the gap between the platforms and the individual stalls as will be described hereinafter.

Thus, a car may be driven onto the platform with one of its wheels riding in secured fashion along the track 147 and the other wheel riding along the wide track 149.

The platform is powered by a prime mover 157 which furnishes power to move cars onto and off the platform; to move the cars while they are in the stalls; and to fold the platform to its vertical position. The prime mover is connected to a gear reduction assembly 159. The gear assembly 159 has three outputs 161, 162 and 163 which serve respectively to move cars while in the stalls, to fold the platform and to move the cars onto and off the platform.

Referring to the output 161 it is noted that the shaft is connected through a brake assembly 165 and to a drive pulley or sprocket 167. The pulley 167 is connected to a corresponding pulley 169 through a flexible tension member, 171. Here as hereinafter the term flexible tension member is considered to include, among other devices, chains, belts, cables and ropes. Moreover, the term pulley is considered to include the term sprocket when a chain is used. The pulley 169 is secured to a shaft 173 which is mounted for rotation and sliding motion in bearings 175. Tapered splines 177 and 179 are secured at opposite ends of the shaft 173 for cooperation with mechanisms on the floors of the garage to be described hereinafter.

Collars 181 are secured to the shaft 173, and a yoke 183 is fitted about the shaft 173 between the collars 181 whereby the shaft may rotate within the yoke but being axially limited to the movement of the yoke itself. The other end of the yoke 183 includes an internally threaded neck 185 for cooperating with the screw shaft 187.

The screw shaft 187 is permitted to rotate but is restrained from axial motion by the mountings 189. One end of the shaft is coupled to a reversible motor 191. Upon operation of the motor 191, the screw shaft 187 is rotated thereby causing the yoke 183 and the shaft 173 to travel axially of the shaft. The pulley 169 is disposed about the shaft 173 with some means such as an elongated spline for permitting axial movement of the shaft but limiting its rotation to that of the pulley. Thus, upon activation of the clutch 166 the shaft 173 is rotated, and upon activation of the motor 191 the shaft 173 is moved axially to engage one of the tapered splines 177 or 179 into a cooperating internally tapered spline mounted on the floors of the garage. Thus, the mechanisms on the floors of the garage may be selectively operated from the platform itself.

The second output 162 serves to fold the platforms into its vertical position in the shaft 11. To this end, the output 162 has a pulley coupled to a cooperating pulley 195 through the flexible tension member 197. The pulley 195 is mounted on a shaft serving as an input to a magnetic clutch 199 the output of which is connected through still another pulley 201. The pulley 201 is coupled through another shaft to the flexible tension member 205. The shaft 203 has mounted thereon a magnetic brake 207 and a winch drum 209.

Thus, it is seen that by activation of the magnetic clutch 199 and the brake assembly 207, which may also be of the magnetic type, the drum 209 is selectively operated. Another flexible tension member 211 is wound about the drum, extended about a stationary pulley 213 and engages a yoke 215 at the opposite end of the platform. The yoke 215 has a movable pulley 217 mounted therein and is disposed for movement with a carriage 219 along the tracks 221 (FIGURE 10d). Thus, upon rotation of the drum 209 the pulley 217 may be drawn to the left, as viewed in FIGURES 9 and 10.

As seen in FIGURE 8, the cable 135 has its ends secured to the vertical support members 129. The cable depends from one of support members 129 about the pulley 223 (FIGURE 9), the idler pulleys 225 to 228, and the return pulley 231 to the opposite vertical support member 129. The cable 135, as it extends past the pulleys 226 and 227, is also in registry with the movable pulley 217.

Since the ends of the cable 135 are secured on the vertical support member 129 the cable length is effectively shortened by traversing the movable pulley 217 to the left as shown in FIGURE 9. By thus shortening the effective length of the cables the platform is folded to its vertical position.

In FIGURE 8 a single cable is shown in conjunction with the double platform assembly. It may, in certain circumstances, be desirable to provide a cable not only on the lower platform 127, as shown, but also on the upper platform 125.

The third output 163 of the gear reduction assembly 159 serves to operate a pair of sleds 233 and 235. The sleds 233 and 235 are provided with rollers 269 which are adapted to ride in the tracks 271 and 273. Thus, the sleds 233 and 235 are limited to movement longitudinal of the platform itself and thus, cooperate to place a car onto or off the platform with an adjoining stall or customer area.

To this end the output 163 has a pulley 237 coupled to a drive shaft 239. Pulleys 241 and 243 are secured to the drive shaft 239 and cooperate with the shafts 245 and 247 respectively through the magnetic clutches 249 and 251. The shafts 245 and 247 also include magnetic brakes 253 and 255 as well as output drive pulleys 257 and 259. A flexible tension member 261 has one end secured to the sled 233. The tension member extends from the sled about the pulley 257, to an idler pulley 263, onto another idler pulley 265 at the other end of the platform, about a turn around idler 267 and again to the sled 233 where its other end is secured. The pulley 249 is secured to the sled 235 in a similar manner.

Thus, upon rotating of the output pulley 237 and by selective activation of the clutches 249 and 251, either of the sleds 233 or 235 may be moved along their respective tracks. Upon reversal of the motor 127; or alternatively by the use of a reversing gear the sleds may be moved in the opposite direction.

Figure 13A:
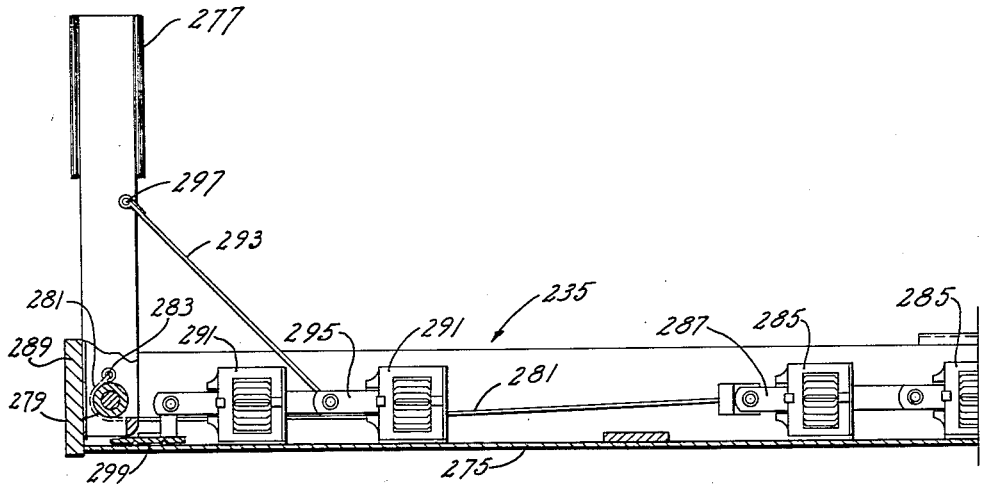
FIGURES 13A and 13B are together a side elevational view of a sled used in conjunction with the platform shown in FIGURES 9, 10, 11 and 12.
Figure 13B:
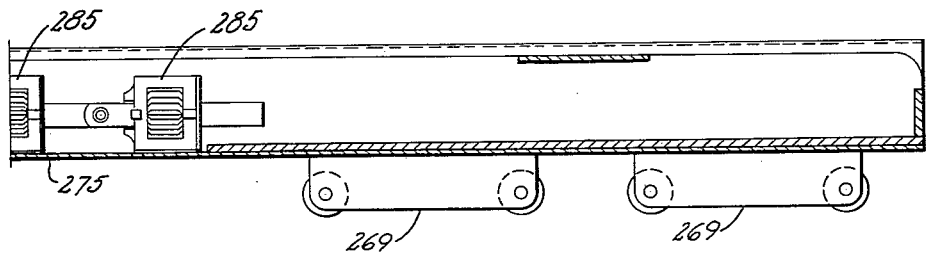
Figure 16:
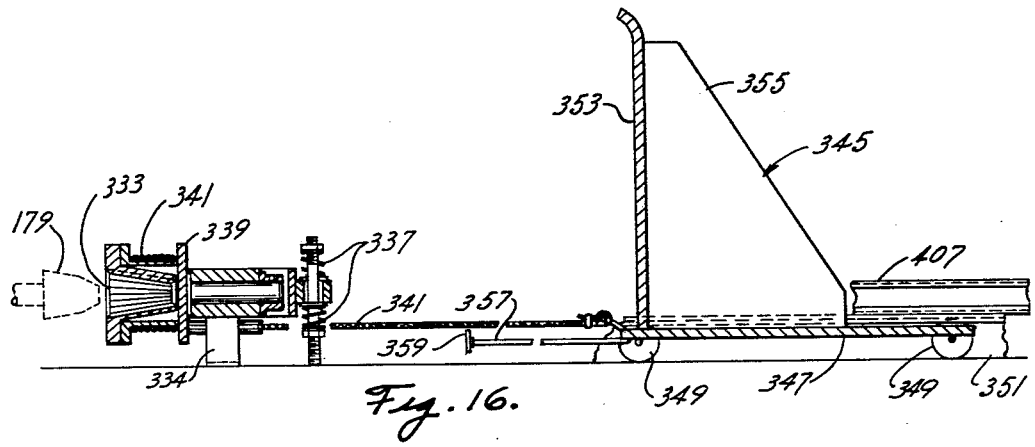
FIGURE 16 is a sectional view taken along the line 16—16 of FIGURE 15 showing the sled used on the floors in accordance with the invention.

Referring more particularly to FIGURE 13, the detailed structure of the sleds is seen. The sled proper shown in the figure includes a base member 275 to which the rollers or roller truck assemblies 269 are attached. A sled arm 277 is rotatably mounted about the pin 279. A flexible tension member 281 is secured to the sled arm at 283 near the pin 279. The cable extends under the pin 279 to a bank of solenoids 285 which are ganged together in tandem fashion. The solenoids 285 are shown in their energized state whereby the plungers 287 are in their right most position thereby causing the sled arm 277 to be rotated counter clockwise about the pin 279 until abutment with the stop 289. Thus, the sled arm is in a vertical position.

A second bank of solenoids 291 has a tension member 293 connected from their plungers 295 to a point 297 on the sled arm.

A shoe 299 is also secured to the plunger 295. The shoe 299 cooperates with the solenoids 291 to lock the sled 277 in its vertical position.

In operation then, with the sled arm in the position shown in FIGURE 13 power need not be applied to either of the solenoids and the arm is maintained in a vertical position by the shoe 299. On activation of the solenoids 291 the plungers 295 are drawn to the right. The shoe 299 is extracted from beneath the sled arm 277 and at the same time the tension member 293 is drawn to the right thereby pulling the sled arm in a clockwise and downward direction. The arm itself may be formed of a channel member whereby in its downward position it overlies the solenoids 291.

Once the solenoids 291 have been initially activated to bring the arm down they may be deactivated and gravity alone will keep the arm horizontal. Upon the subsequent activation of the solenoids 285 the flexible tension member 281 is drawn to the right thereby rotating the arm in the counter clockwise direction about the pin 279. The shoe 299 is then urged under the arm 277 either by activation of the solenoids 291 or by spring return of the plungers 295.

The opposite sled 233 shown in FIGURES 9 and 10 is constructed in the same manner as the one shown in FIGURE 13. As it is seen the sleds may be activated to raise the arms and to be traveled longitudinally along the platform. Thus, an automobile in the path of one of the sled arms will likewise be moved along the platform and an automobile held between the two arms may be retained on the platform by activation of the brakes 253 and 255.

It should be noted that the sled arm 277 are displaced a substantial distance from the wheels 269. Thus, the sleds may be used to "reach over" to adjacent areas for moving a car thereto or from.

The Spanner Unit

Referring to FIGURES 12 and 14 the spanner unit is shown. The spanner unit, as mentioned above, serves to bridge the gap between the platform members and the individual floors. The portion of FIGURE 12 relating to the left hand track member 147 is in reality a section taken along the lines 12'—12' of FIGURE 14. The spanner unit 151 for the track 147 is similar to the spanner 152 on the track 149. Consequently, only the one unit will be described.

A spanner tray 301 overlies the track member 147 and is guided in a longitudinal direction thereby. The front edge of the spanner tray includes a spanner bar 303 which may connect to the front of the spanner unit 152. This, however, is not entirely necessary and the two spanners may operate independently. The connection of the spanner bar 303 is to the front plate 305 by which the movement of the spanner is controlled. Runners 307 are connected to the front plate and ride with the roller configuration 309. The individual rollers may be mounted on the platform itself or on the runners 307.

A pair of looped hooks 311 straddle the runners 307 and are permitted to ride thereon. The hooks 311 are interconnected by an intermediate bar 313. The bar 313 provides support for the spanner unit in its extended position.

A drive shaft 315 is axially secured to the front plate 305. The drive shaft 315 passes freely through the intermediate bar 313 and is activated by a motor 317 through a drive coupling 319. The drive system including the shaft 315 and the coupling 319 may be any of a number of types including a rack and pinion or screw shaft and nut. Moreover, the shaft itself may be rotated through a positively secured nut to provide the required axial movement.

Limiting rods 321 and 323 serve to arrest the movement of the intermediate bar 313 as well as to limit the maximum extension of the spanner tray 301. The rods 321 and 323 pass freely through the intermediate bar but have collars 325 and 327 secured thereon to limit the bar movement. Instead of the single rods 321 and 323 multiple bars may be utilized. For instance, each of the rods 321 and 323 may be replaced by two rods one being located on each end of the intermediate bar 313. Thus, any possibility of cocking the intermediate bar with respect to the runners 307 would be reduced.

In operation, then, upon activation of the motor 317 in one direction the spanner is extended to a maximum distance limited by the rods 321 and 323. At the full extension the motor 317 may be turned off or a friction clutch mechanism may be utilized to permit continuous operation of the motor. It is clear that upon reversing the motor, the spanner unit is withdrawn to its original position in alignment with the edge of the platform itself. The spanner unit and especially the spanner bar 303 are utilized in controlling operations of mechanisms on the various floors themselves. This operation will be described hereinafter in connection with the description of the floors.

STALLS

FIGURES 15 through 20 relate to the structure of the floor surfaces whereon the cars are actually stored. The area on the opposite side of the shaft will be identical in structure to that shown in the figures but the layout will be a mirror image. Thus the narrow track 147 of the platform, if viewed from one side of the shaft is on the left hand side and if viewed from the other side of the shaft is on the right hand side. The narrow track 329 on the floor surface as shown in FIGURE 15 corresponds to the narrow track 147 on the platform. For a floor section on the opposite side of the shaft 11 the narrow track 329 would be viewed on the left hand side of the stalls or slot as shown in FIGURE 15.

The view seen in FIGURE 15 is merely a partial view of the floor area in a particular slot which may comprise a number of stalls. It should be noted that since cars are parked in the garage bumper to bumper, the stalls themselves are not of definite dimension but are the relative positions of various cars in the particular slot.

Car Movement in the Stalls

Means are provided in each of the slots as shown in FIGURE 15 for moving the automobile parked thereon onto a platform. However, it is desirable to place no power equipment in the slots themselves. Thus all power is derived from the movable platforms. To this end a tapered female spline 333 is included in the slot for cooperation with the male spline 179 operated from the platform. The spline 333 is resiliently mounted on vertical and horizontal axes 334 and 335 respectively. Resilient means 337 are provided for retaining and urging the spline to a central position. With such a mounting it is not necessary for the platform to be in absolute registry with the floor in order to form a cooperative relationship between the male and female splines.

A drum 339 is secured to the female spline 333 to rotate therewith. The drum is adapted to receive a flexible tension member 341 which extends about the pulley 343 to the movable sled 345.

The sled 345 includes a base member 347 having wheels 349 rotatably mounted thereon. The wheels are adapted to ride in tracks 351 which extend longitudinally with the slot. The tracks may comprise box-like members with side openings for the axles of the wheels 349 and thus serve not only to guide the sled 345 but also to prevent its overturning under tension. The sled 345 also includes an upright arm 353 which is dimensioned to register with the bumper of an automobile and thus apply means for moving the automobile toward the shaft and the platforms. Braces 355 may be included to strengthen the upright arm 353.

An extension 357 having an end plate 359 is also secured to the base 347 of the sled for cooperation with sensor units on the spanner as will hereinafter be described.

It is seen that upon engagement of the male spline 179 with the female 333 the drum 339 may be rotated to draw the tension member 341 and the sled 345 toward the shaft 11. Friction braking means may be employed to prevent free movement of the sled 345 when there is no positive drive.

Chocks

Figure 17:
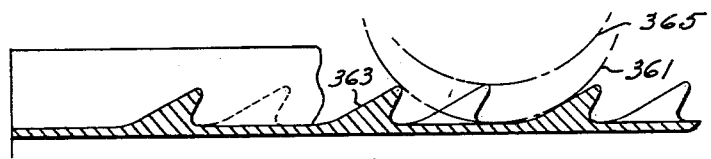
FIGURE 17 is a sectional view taken along the line 17—17 of FIGURE 15 showing a chock system in accordance with this invention.

In addition to providing means for moving the cars from the stalls on to the platforms in the shaft 11 means must be provided in the slots to retain the cars therein from movement even considering such possibilities as earthquakes. A chock system may be included wherein slight detents may be impressed in the tracks of the car tires themselves. As shown in FIGURES 15 and 17 these detents may take the form of permanent structural members, the chocks may take the shape of wave crests thrown away from the shaft 11.

Moreover, the chocks may be located not only in the narrow track 329 but also in the wide track 330. The chocks in the two tracks 329 and 330 are offset or staggered such that one of the tires is engaged with a chock at all times. Thus the tire 361 in the near track shown in FIGURE 17 is engaged with the chock 363. On the other hand the opposite tire 365 is riding over the chock 367. Upon slight longitudinal movement of the car the opposite situation will occur wherein the tire in the wide track will engage the chock to retard the movement of the car while that in the near track will afford little retention.

Figure 18:
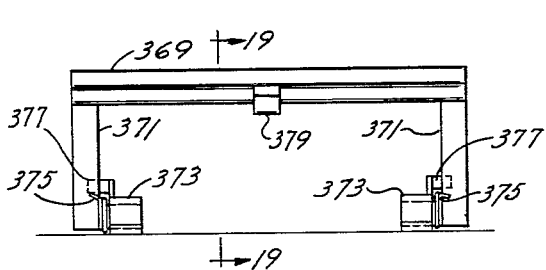
FIGURE 18 is a front elevational view of an alternative chock system in accordance with this invention.
Figure 19:
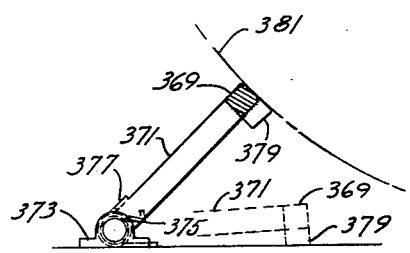
FIGURE 19 is a side elevational view of the chock system shown in FIGURE 18.

Referring to FIGURES 18 and 19 an alternative chock is shown. Here a steel bar 369 is secured to the members 371 which pivotally engage the bearings 373. A spring 375 may be employed to urge the chock into an upright position and the ear 377 on the bearing may be employed to limit the upward excursion. A block or spacer 379 is secured to the bar 369 to prevent the chock from lying completely flat.

In operation the chock is normally urged into the upright position shown in solid lines in FIGURE 19. The tire 381 on the car is thereby retained. However, when the force of the tire exceeds a predetermined amount the car attempts to roll over the chock and thereby presses it down into the position shown in dotted lines in FIGURE 19. Even in this position there is a similar but lesser chock effect whereby completely free rolling of the car is eliminated.

Friction Brake

Figure 20:
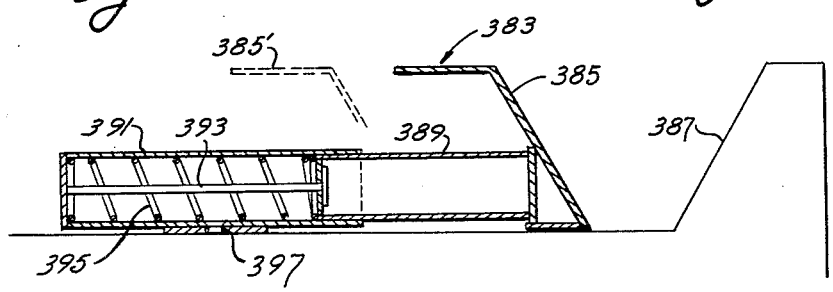
FIGURE 20 is a sectional view taken along the line 20—20 of FIGURE 15.

In addition to the chocks means is also provided at the shaft end of the slots to more securely retain cars against any motion either forward or backward. To this end a resilient shoe assembly 383 is provided as shown in FIGURES 15 and 20. The assembly includes a pinch member 385 which cooperates with the side 387 of the track 329 to pinch an automobile tire therebetween. The pinch member is held by the pistons 389 which are retained in the cylinders 391 by limiting rods 393. Spring 395, between the base of the cylinder 391 and the piston 389 urges the pinch member 385 toward the side 387 of the track.

Cylinders 391 are pivotally secured to the floor at 397 to provide nonparallel movement of the pinch member. Thus, in its normal position the pinch member 383 is as shown in solid lines in FIGURES 15 and 20. When a car tire enters track 329, the pinch member is urged backward as shown in dotted lines 385'. As the tire proceeds along the track the pinch member assumes position shown in dotted lines 385". At all times while the tire is adjacent the pinch member, the springs 395 provide a pinching effect on the tire. It is only by the force of the platform sleds or the sled 345 that the car is moved through the shoe assembly. Thus, the car is retained when these forces are not present and thereby provide a sure braking action.

Between Car Bumpers

Figure 21:
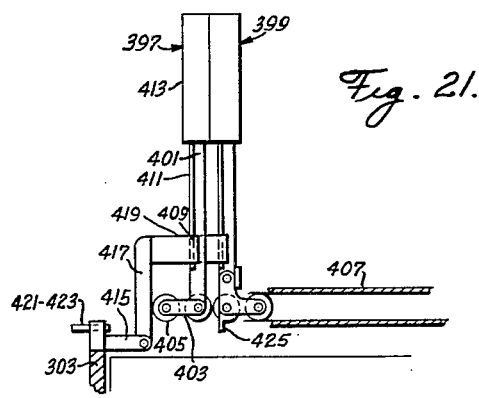
FIGURE 21 is a side elevational view of the between car bumpers used on the floors in accordance with this invention.
Figure 22:
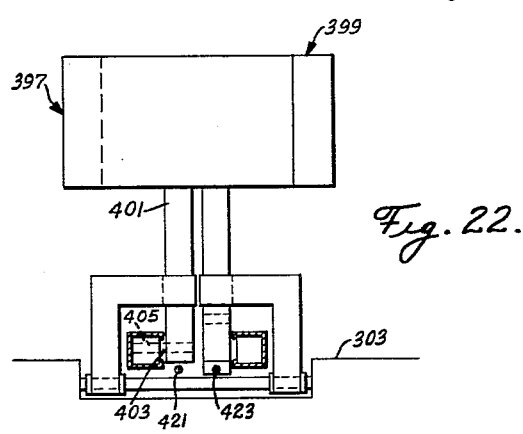
FIGURE 22 is a rear elevational view of the bumpers shown in FIGURE 21.

Referring to FIGURES 15, 21 and 22 means are shown which provide for safe and quiet mating between bumpers of various cars. Thus, two bumper assemblies 397 and 399 are shown, each of the assemblies is somewhat similar and includes an upright arm 401 secured to a carriage 403 having wheels 405. A track 407 (FIGURE 16) overlies the track 351 and carries the wheels 305. The track 407 like the track 351 is a box member having a side opening for the wheel axles whereby the track not only provides guidance for the bumper assemblies but also prevents its overturning under pressure.

The arms 401 are pivotally secured to the carriage 403 and are spring urged to the vertical position with a stop preventing further clockwise motion.

As are shown in the figures there are two such bumper assemblies which are utilized in a garage having slots capable of receiving three cars. One of the bumper assemblies is disposed between the first and second car while the second assembly is disposed between the second and third car. Clearly, in garages having slots which receive more than three cars additional bumper assemblies will be employed.

A ferrous material block 409 such as iron or steel is retained in a slide track 411 of the arm 401. The ferrous block is used to cooperate with a magnet on the spanner assembly and serves as a means to rotate the arm 401 in the counter clockwise direction about its pivot and thereby reach a horizontal position such that cars may overpass. The assembly also includes the large pad 413 of a nonabrasive material such as rubber to be interposed between the bumpers of the separate cars.

The bumper assemblies, as shown, are activated by mechanisms which are mounted on the platforms themselves rather than in the stalls. More particularly the elements are mounted on the spanner units of the platforms. Thus the spanner plate 303 (FIGURES 12 and 21), carries an extension 415 having an arm 417 pivotally secured thereto. An electro-magnet 419 is secured at the end of the arm 417 and serves to cooperate with the ferrous block 409 to rotate the arm 401 to a horizontal position. Upon proper activation to be described hereinafter, the arm 417 is rotated in the counter clockwise position carrying with it the arm 401. Due to the different centers of rotation the ferrous block 409 is traversed across the slide track 411. Spring or other means may be provided to restore the ferrous block to its original home position after release from the electro-magnet.

The bumper assemblies have no power of their own but are traversed across their tracks by movement of the car as urged by the various sleds. Since the bumpers are only to be placed between cars there is no need to engage a bumper when the first car enters a slot. Thus, when the first car enters a slot means are provided to sense that it is the first car and to take both bumper assemblies out of position by placing them in the horizontal.

Moreover, after the first car has been placed in the stall there are means provided to sense that one car is in the stall and a single one of the bumper assemblies is lowered to the horizontal so that the remaining bumper assembly is disposed between the first car already in the stall and second car being placed therein.

To this end sensing rods 421 and 423 are provided in the spanner unit. Sensing rod 421 cooperates with the extension 357 and end plate 359 (FIGURE 15) on the sled 345. When there is no car in the slot the sled 345 is in a position near the shaft 11, such that the end plate 349 is adjacent to shaft. Upon extension of the spanner, the sensing rod 421 contacts the end plate 359 thereby activating a switch to apply magnetizing power to electro-magnets 419 for both of the bumper assemblies 397 and 399. Thus both bumper assemblies may be rotated counter clockwise to the horizontal position whereby a car may be passed over the assemblies and directly contact the sled 345 without the interposition of a bumper assembly.

The sensing rod 423 cooperates with an ear 425 on the bumper assembly 395. Thus, when the spanner is extended the rod 423 senses the ear 425 to activate the switch which energizes only the electro-magnet 419 which is the assembly 397. The bumper assembly 397 is rotated to the horizontal position while the assembly 399 is maintained in a vertical position. Thus upon entrance of the second car to the slot the assembly 399 is urged along the slot with the second car and is thus interposed between the first and second cars.

When the third car is placed in the stall, since neither the sled 345 or the bumper assembly 399 is in position neither sensor rod activates an electro-magnet and the remaining bumper assembly 397 is left in its vertical position. Thus, the third car urges the bumper 397 into position between the second and third cars.

In those platforms where no spanner is necessary the sensing rods and electro-magnet arms may alone be extended to provide the same effect.

OPERATION OF THE SYSTEM

Placing Cars in the Garage

Figure 23A:
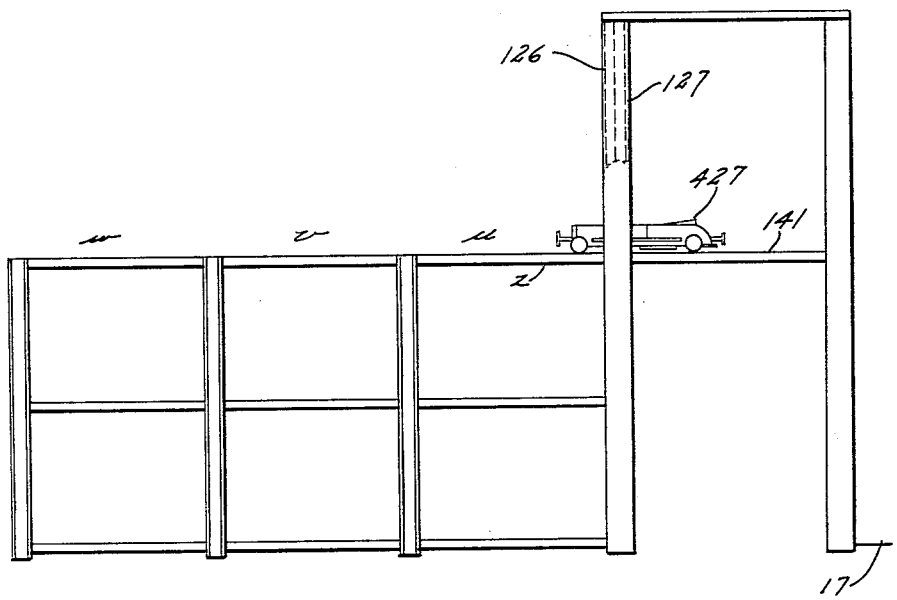
FIGURES 23A and 23B are schematic representations showing the operation of the system while loading cars.

Referring to FIGURES 23A and B the operation of the system is shown for placing automobiles in storage spaces or stalls $u$, $v$ and $w$.

As is seen double platform assembly including the platform members 126 and 127 are in their vertically folded position which may be the normal rest or "home" position for these platforms. Referring to FIGURE 23A, first car 427 may be moved onto the platform member 141 while it is in its lowermost position adjacent the entrance area 17 and subsequently be raised into registry with the floor $z$. Upon reaching this position the platform 141 is locked and the automobile 427 is moved into the first stall $u$.

Figure 23B:
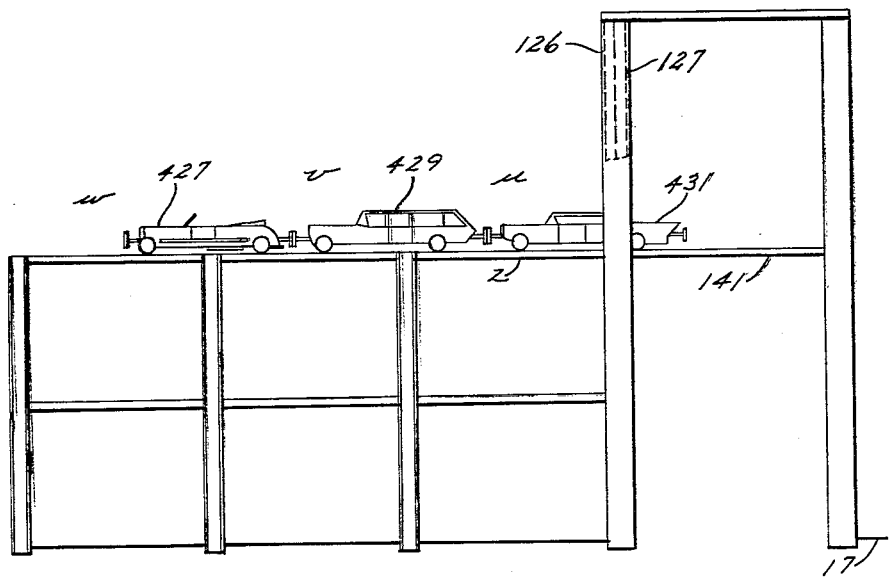

Additional automobiles added to this slot are placed behind the first automobile 427. Thus, the second car 429 is moved into the stall $u$ and at this time the car 427 will be moved into the adjacent stall $v$. Upon loading the third car 431, the first car 427 is placed in the stall $w$, and the second 429 is placed in the stall $v$. The last car 431 is placed in the stall $u$. Thus, it is seen that the automobiles are arranged in the stalls from left to right in the order of entrance, as shown in FIGURE 23B.

Removal of the Cars From the Garage

Referring to FIGURES 24A through D an operation is shown in the parking system for delivery of the first car 427 to the customer while the cars 429 and 431 remain stored.

Figure 24A:
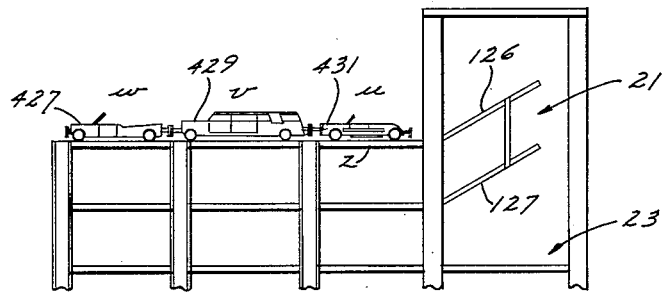
FIGURES 24A–24D are schematic representations showing the operations of the system while unloading a car previously parked.
Figure 24B:
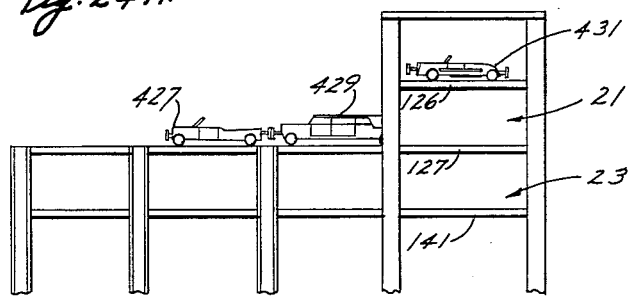

As seen in FIGURE 24A the double platform assembly 21 is lowered to its horizontal position with the platform member 126 in registry with the floor $z$ on which the car 427 is located. All the cars 427, 429 and 431 are backed from left to right, with car 431 being placed on the platform 426. At this point the double platform assembly 21 is raised as shown in FIGURE 24B leaving the platform 427 adjacent the floor $z$.

Figure 24C:
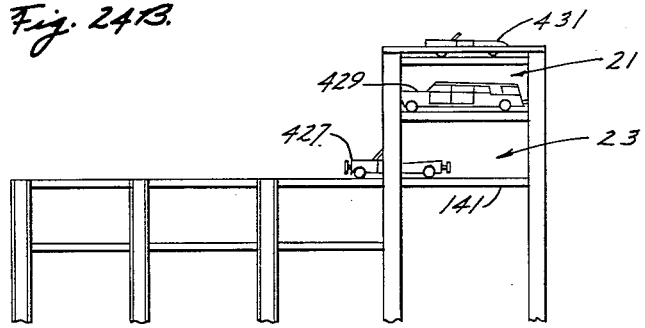
Figure 24D:
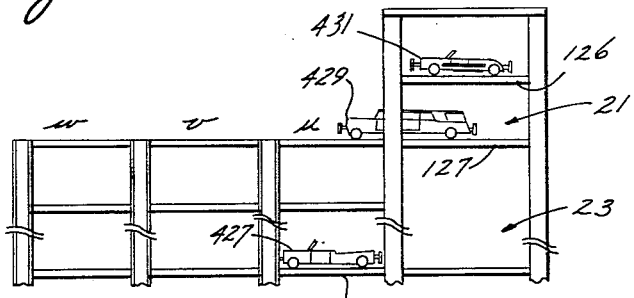

The automobile 429 is then backed onto the platform 127 and the double platform assembly 21 is raised clear of the floor $z$. At this time the single platform assembly 23 is raised into registry with floor $z$, and the automobile 427 is backed onto the platform 141 as seen in FIGURE 24C. The single platform assembly 23 is then lowered to a position in registry with the exit area 19 as shown in FIGURE 24D. The car 427 is then moved through the exit 19.

While the platform assembly 23 is being lowered to the exit area 19 the double platform assembly 21 is lowered with its platform 127 in registry with the floor $z$. The automobile 429 is then moved back into the stall $u$, as shown in FIGURE 24D. The double platform assembly 21 is then further lowered until the platform 126 is in registry with the floor $z$ and then the automobile 431 is moved onto the floor $z$ behind the automobile 429.

Upon the addition of another car into this particular slot along with the cars 429 and 431, the operation is similar to that described in connection with FIGURE 23. The car 429 will then occupy the stall $w$, the car 431, the stall $v$, and the latest car (not shown) in stall $u$.

In certain instances, especially for exceedingly tall garages it may be advisable to include additional platform assemblies in a single shaft. In these instances one set of platforms may have a home position near the top of the shaft and the other, a home position near the bottom. Thus, the average time for a platform to reach a given floor is reduced.

AUTOMATIC CAR TRACING

Figure 25:
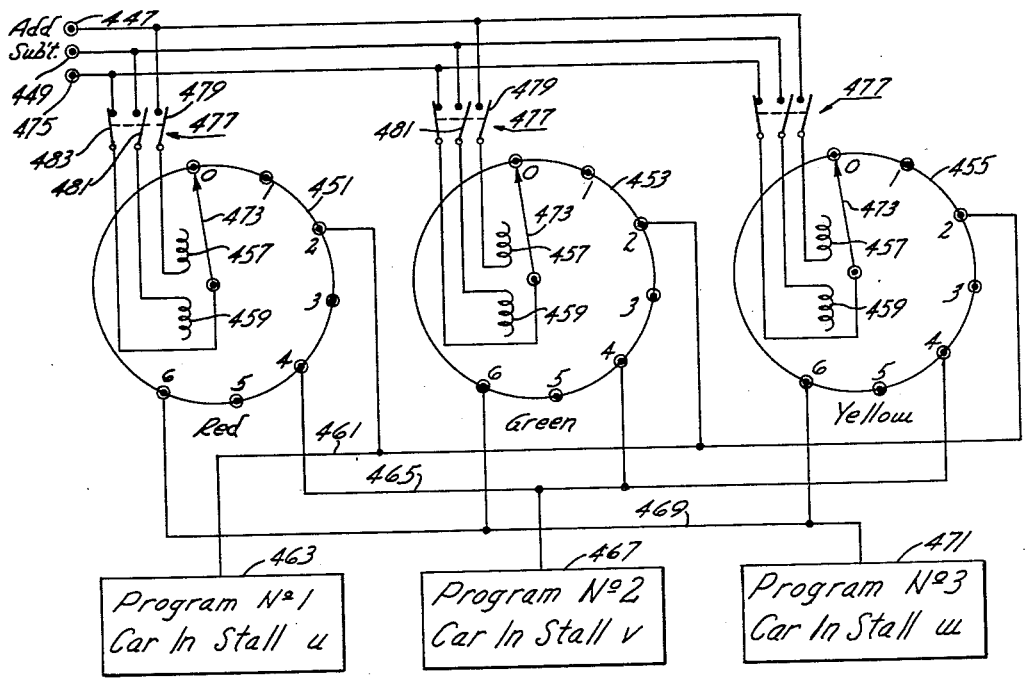
FIGURE 25 is a schematic diagram of a circuit for keeping track of a car in accordance with this invention.
Figure 26:
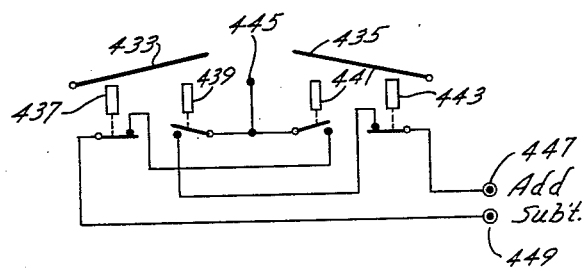
FIGURE 26 is a schematic diagram of a switch system used in the circuit of FIGURE 25.

In order to continually keep track of cars in the garage automatic means are provided as shown in FIG. 25. The circuit shown in FIGURE 25 is activated by switches as shown in FIGURE 26 which are installed in a slot. The switches are preferably installed in that portion of the floor section where the automobile tires roll.

Referring particularly to FIGURE 26 switch means are shown including the treadles 433 and 435. It may be assumed that the treadle 433 is located on the floor near to the shaft 11 while the treadle 435 is more remote. Two plunger switches 437 and 439 are located under treadle 433 for activation thereby. Additional plungers 441 and 443 are placed under the treadle 435 for similar activation. The switch as shown here merely derives a signal determinative of whether a car is driven into or out of a slot. Thus a circuit may be established with a terminal 445 to the add terminal 447 through the switch 439, when closed and the normally closed switch 443. Likewise, a circuit may be established between the terminal 445 and the subtract terminal 449 through the switch 441, when closed, and the normally closed switch 437.

In operation, if a car is driving from left to right is indicative of one going into the slot, the treadle 433 is depressed by the tire, thereby opening switch 437 and closing the switch 439. By opening the switch 437 the subtract circuit is disabled, however, the add circuit is completed and the signal may be applied therethrough. Means are provided in the switch for maintaining the switch 437 momentarily open after initial activation by the treadle 433 such that, upon subsequent passage of the car over the treadle 435 the subtract circuit will not be completed.

Conversely, as a car moves from right to left the treadle 435 is first depressed thereby disabling the add circuit and completing the subtract circuit.

Referring again to FIGURE 25 a representative number of switches 451, 453 and 455 is shown. In a garage of the type wherein three cars are accommodated in any slot, three counting switches are used to determine the position of the various cars in the slot. Thus, in a garage which may accommodate 1,000 cars there will be 1,000 such counting switches. The switches, however, are arranged in groups the number of which is determined by the number of cars in a particular slot. In FIGURE 25 three switches are arranged in a single group corresponding to three cars in that slot.

It is noted that each of the switches includes two stepping coils 457 and 459 which may be selectively coupled to the add or subtract terminals 447 and 449 respectively. This provides possible forward and reverse stepping. Each of the switches include six active positions plus a home position. It is noted that the odd numbered active positions are not connected. Thus, when the first tire of a car rolls over the treadle switches the counter switches are stepped to their first position but no circuit can be completed. Only when the second tire rolls over the treadle switch is there a possibility of completing a circuit.

The second position on each switch is connected to a common line 461 to a circuit 463 which activates a first program. The fourth position of each switch is connected to another common line 465 which in turn is connected to a circuit 467 for activating a second program. Likewise, the sixth position of each switch is connected to a common line 469 then to a circuit 471 for activating a third program.

The various programs activated by the circuits 463, 467 and 471 are such as to deliver a car from the various stalls $u$, $v$ and $w$ respectively. Thus, in program number 1, the car is delivered from the stall $u$. Only a single platform assembly need be utilized to take the car out of that stall and deliver it to the exit area. The program activated by the circuit 467 will deliver a car from the stall $v$, whereby the double platform assembly is utilized to remove the car from the stall $u$ temporarily and to place the car from the stall $v$ onto the single platform and deliver it to the exit area. The program initiated by the circuit 471 is similar to that program previously described in conjunction with FIGURE 24 wherein the car from the stall $w$ is removed on the single platform after temporarily storing the cars in the stalls $u$ and $v$ on the double platform. Power is selectively applied to the particular circuits 463, 467 and 471 through their respective lines and the wipers 473 of the various counter switches which are selectively coupled to a terminal 475. For program activation a source of power may be connected across the terminal 475 and the program circuits.

It is noted that each of the switches 451, 453 and 455 is associated with a separate key operated ganged switch 477 which includes two normally open and one normally closed contact. The normal position is attained when the key is in position. The keys remain in position as long as there is no car associated with their particular switch. When a car is brought to the garage a key is removed from its position and may be rendered to the customer, upon removal of the key the switch contacts 479, 481 and 483 associated with that particular key are operated. At this point the counter switch is permitted to be stepped upon activation of the proper treadle switches but no power is permitted to pass through the various program circuits 463, 467 and 471. These switches then are really a part of the counting circuit and may be stepped in either direction dependent upon the activation of the add or subtract circuits shown in FIGURE 26. Thus, the first car into a slot may be designated as "RED" and the key associated with the "RED" counting swtich 451 may be withdrawn thereby operating the associated ganged switch.

Means are also provided upon the removal of the key to automatically place the car onto a platform. Means are also provided upon removal of the key from any of the switches 451, 453 and 455 to place the car into the particular slot associated with hat key. Thus, the first car, now designated as "RED," is placed into the proper slot and depresses the treadle switches 433 twice (once for each wheel on one side). Two add pulses are thereby provided at the terminal 447 and thereby step the switch 451 to the "two" position. The activation of the add circuit is inoperative to cause stepping of the switches 453 and 455 at this time since their associated keys are still in place. Thus, the condition of the switches at this point would be that the wiper of the switch 451 is located at its second position while the wipers of the switches 453 and 455 remain in their zero or home position. When a second car is to be parked in this particular slot, a second key, for instance, that associated with the switch 453 is withdrawn. The second car then may be designated as "GREEN" and upon placing the car in the slot the treadle switches 433 are again depressed twice. These depressions of the treadle switch cause the wiper of the switch 451 to be moved to the fourth position while the wiper switch 453 is now located in the second. The wiper of the switch 455 remains in its home position since its key is still in place.

Similarly when a third car indicated as "YELLOW" is placed in the slot the key associated with the switch 455 is removed thereby allowing that switch to be stepped along with the other two switches when the car is placed in the slot. Thus, the arrangement of the switches when the three cars are located in the slot is the first switch 451 has its wiper set on the terminal "six" position, the second switch 453 has its wiper under the "fourth" position and the switch 455 has its wiper in the "two" position, each being indicative of their associated cars in the stalls $w$, $v$ and $u$ respectively.

If one of the cars, for instance, the one designated as "GREEN," is to be removed from the slot, the key for its associated switch 453 is returned thereby permitting power to be applied through the wiper arm to the terminal "4" and to the circuit 467 which initiates program number 2. As stated above program number 2 is such that the car from the second stall $v$ is removed.

For this operation the "YELLOW" car in stall $u$ must first be moved onto the double platform assembly. Removal of this first car will cause activation of the treadle switch 435 (FIGURE 26) and thereby cause subtract pulses on the switches 451 and 455 thus, placing them in the positions "four" and "zero" respectively. When the desired car is removed the treadle switch is again depressed thus placing the switches in its "two" position. The switch 455 already having reached its home position does not step back farther but remains in the home position.

With respect to the switch 453 there may be means provided so that the contacts 479 and 481 remain closed until the car is removed and then return the wiper to its home position. Preferably, however, it is desired that the program circuits 463 and 467 and 471 themselves provide activating means for resetting the switch to its home position after the key is replaced. After the "GREEN" car is removed from the slot the "YELLOW" car is replaced in the slot causing the treadle switch to be depressed and producing add impulses. Thus, the switch 451 is again advanced this time to the "four" position and the switch 455 is advanced to its "two" position indicating that the cars are in the $v$ and $u$ stalls respectively. Thus, it is seen that regardless of the manipulations undertaken the switches 451, 453 and 455 continually keep track of their respective cars.

AUTOMATIC PARKING FEE COMPUTATION

Figure 27:
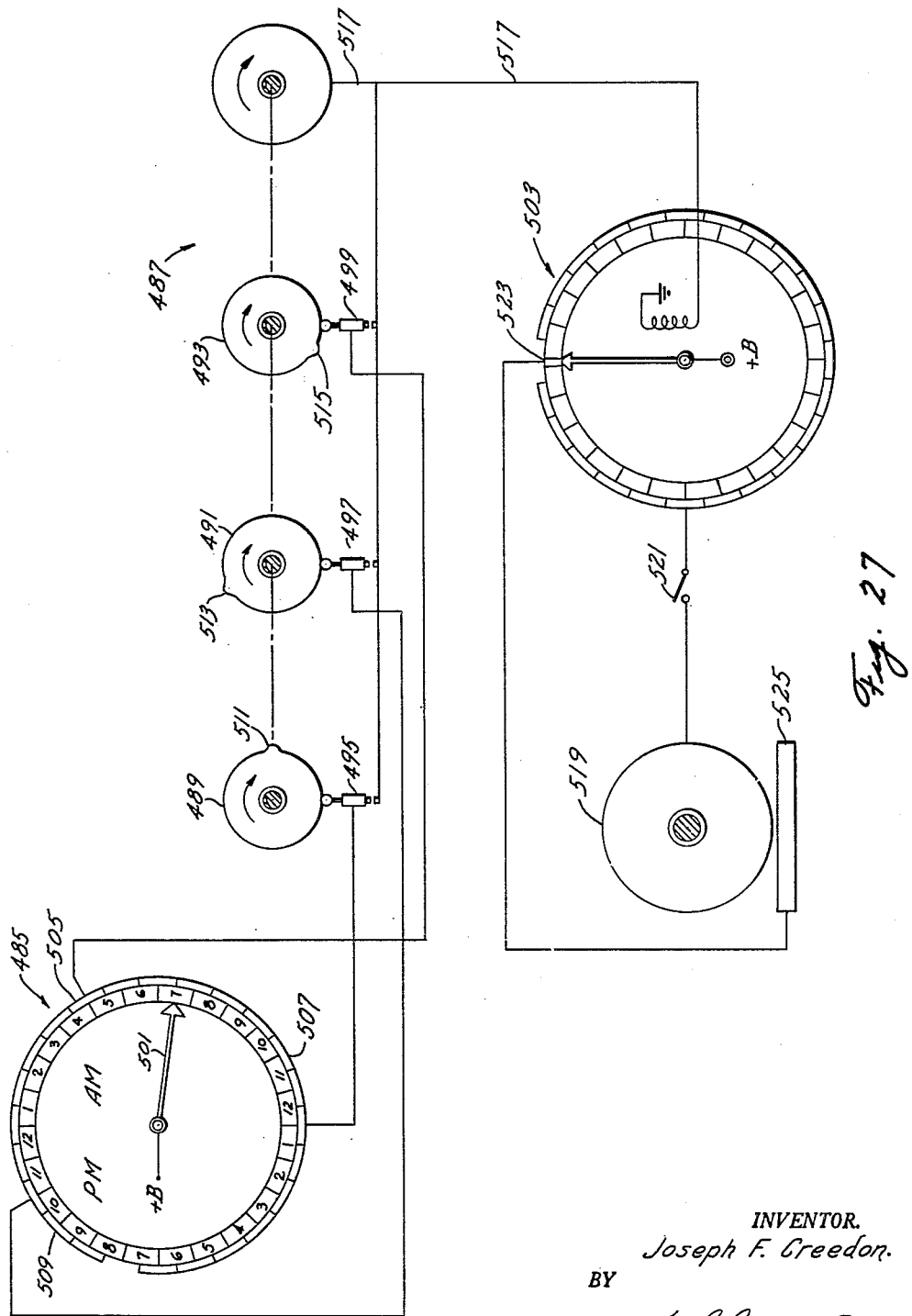
FIGURE 27 is a schematic diagram of a circuit for computing the parking fee of cars using the present parking system.

Referring to FIGURE 27 circuit means is shown for automatically computing the parking fee of the various cars in the garage. Thus, a master clock 485 is provided which may be of the 24 hour variety and have a terminal for each hour or have slide terminals which can separate the twenty-four hours into various time zones. In order to facilitate any computation when different parking rates are in use during different hours of the day or the different time zones a timer 487 having cam wheels 489, 491 and 493 is provided. The terminals corresponding to various time zones on the clock 485 may be connected to switches 495, 497 and 499 each being associated with a particular cam wheel.

The switches 495, 497 and 499 serve to connect a source of power through the wiper arm 501 of the master clock 485 to a stepping switch 503 which keeps account of the cost units to be used in computing the fee.

It should be noted that one master clock 485, one timer 487 and one stepping switch 503 is provided for each car to be parked.

Operation of the fee computing system as thus far described, is as follows: The master clock 485 is divided into a low cost time zone 505, a high cost time zone 507 and a medium cost time zone 509. A line is connected from the terminals in the high cost time zone through the switch 495 which cooperates with the cam wheel 389. Likewise, the terminals from the low cost and medium cost time zones are connected to the switches 499 and 497 respectively. Each of the cam wheels is secured to a common shaft which has a home position which places each of the cam surfaces in the position shown in the figure. It is noted that the cam surfaces 511, 513 and 515 are displaced from their respective switches 595, 597 and 599 at different angles. Since rotation of the timer always begins at the home position and since each of the cam wheels is on the same shaft, a lesser time is required for the cam surface 511 to operate its switch 495 than for the other cam surfaces to operate their respective switches.

When the wiper 501 of the master clock 485 contacts the terminals in the high cost time zone 507 the switch 495 serves to pass a voltage through to the line 517. When the voltage placed on the line 517 the timer 487 is reset whereby the cam surfaces are restored to their home position as shown in the figure. If, however, the wiper 501 of the master clock 585 is on the terminals of the low cost time zone 505, the operation of the switch 594 will have no effect on the line 517 and the timer will continue to rotate until the cam 515 operates its respective switch 499 thereby placing voltage on the line 517.

The voltage on line 517 is also applied to a stepping switch 503 and serves to step its wiper in a clockwise direction. Stepping the wiper in the clockwise direction produces no effect other than locating the wiper itself. When, however, it is desired to remove the particular car associated with this fee computing circuit placement of the key as referred to with respect to the previous circuit (FIGURE 25) causes the stepping switch 503 to return to its zero or home position. The terminals of the stepping switch 503 are connected to a printing disc or wheel 519 through the switch 521 which is closed when the key is returned to the slot. When the key is so returned impulses from the backward stepping of the switch 503 causes the print wheel 519 to be indexed. Upon finally reaching the home position the wiper of the stepping switch 503 contacts the terminal 523 and provides an impulse to the printing head 525 and causes an output printing of the previously indexed fee.

Thus, it is seen that means is provided for computing the parking fee of the cars in the garage. Various rates during the day are accommodated by the various cam wheels on a timer. After the predetermined amount of rotation of the timer, and depending upon the particular time of the day or cost time zone an impulse is provided to the stepping switch 503. When it is desired to remove the car, the associated stepping switch is stepped, each return step providing an indexing pulse to a printing wheel 519. After finally reaching the home position, a pulse is provided to a printing head whereby the preindexed fee is printed.

Thus, it is seen that the various steps of the switch 503 correspond to equal price differentials and not necessarily to hours. Thus, when the wiper 501 of the master clock 585 is in the higher price zone, the switch 503 will be stepped more frequently than if the wiper 501 is located in the low cost time zone 505.

SUMMARY

Thus, it is seen that a new automatic parking system is provided. The parking system may be entirely automatic whereby the customer merely drives into an entrance area and removes a key from a control panel which removal causes his car to be stored in a predetermined stall. At this time fee computing apparatus begins to operate. When the customer later returns he merely places the key back into the slot which may be coded in a color and shape fashion. Replacing the key initiates programs for removing his car from the particular slot into which it was placed. Moreover, replacing the key completes circuit means for activating the parking fee computing apparatus or circuit whereby the customer's fee is imprinted.

An attendant need merely determine the amount of the fee and collect the same from the customer. With the advent of more sophisticated vending apparatus even the attendants job would not be necessary. It is obvious that means may be provided to automatically release the car only upon payment of the computed fee.

The parking system described hereinbefore provides features not hitherto known in the prior art. The garage provides maximum efficiency in the use of available space which today is at a premium in high traffic areas of large cities. Thus, a highly economical and automatic parking system is provided.

I claim:
1. A parking system comprising a series of vertical tiers, each of said tiers including a plurality of stalls for parked auotmobiles, a vertical shaft adjacent to each of said tiers, a plural and a single folding platform assembly slidably disposed in said shaft, said platform assemblies being vertically clear of each other when said plural platform assembly is in its folded position.

2. A parking system comprising a series of vertical tiers, each of said tiers including a plurality of stalls for parked atuomobiles, a vertical shaft adjacent to one of said stalls in each tier but separated from other stalls in the tiers by said one stall, a first platform assembly having platforms numbered one less than the number of stalls in a tier, a second platform assembly having a single platform, each of said platforms being foldable in a horizontal and vertical position, said first platform assembly in its vertical folded position being vertically clear of said second platform assembly.

3. A parking system comprising a first and a second series of vertical tiers, each of said tiers including a plurality of stalls for parked automobiles, a vertical shaft disposed between said first and second series of tiers and adjacent to one stall in each tier but separated from other stalls in the tier by said one stall, a first set of platform assemblies slidably disposed in said shaft and carried on one side thereof, a second set of platform assemblies slidably disposed in said shaft and carried on the other side thereof, each of said sets of platform assemblies including a plural and a single folding platform, each set of platform assemblies being vertically clear of the other when one set is in its folded position.

4. A parking system comprising a vertical tier including a plurality of floors, each floor having a plurality of stalls for parked automobiles, a vertical shaft adjacent said tier, a plural and a single folding platform assembly slidably disposed in said shaft, said platform assemblies being vertically clear of each other when one of said assemblies is in its vertically folded position.

5. A parking system as defined in claim 4 together with motive means for vertically moving said platform assemblies in said shaft, each said motive means comprising first and second motors, said first motor having a higher speed output than said second motor, said first motor being coupled to a platform assembly, said second motor being coupled to the same assembly through a clutch whereby said second motor may be selectively employed to level said platform assembly.

6. A parking system as defined in claim 4 together with motive means for vertically moving said platform assemblies in said shaft, each said motive means comprising a motor having first and second outputs, first and second clutch means, each of said outputs being coupled to one of said clutch means, a first and a second speed reduction chain, each of said outputs including a different one of said speed reduction chains.

7. A parking system as defined in claim 4 wherein each of said platform assemblies includes a platform, said platforms having single motive means for moving automobiles while in said stalls, for moving automobiles onto and off said platform and for folding said plaftorm assembly.

8. A parking system as defined in claim 4 wherein each of said platform assemblies includes a platform, said platform having drive means for applying power to external loads, said drive means including a motor, shaft means mounted for rotational and axial movement on said platform, means selectively coupling said shaft to said motor to impart rotational motion thereto, an auxiliary motor, means selectively coupling said shaft to said auxiliary motor for imparting axial motion to the shaft and means secured on said shaft for coupling to an external load.

9. A parking system as defined in claim 8 wherein said means for coupling to an external load includes a tapered spline at each end of said shaft.

10. A parking system comprising a vertical tier including a plurality of floors, each floor having a plurality of stalls for parked automobiles, a vertical shaft adjacent said tier, a plural and a single folding platform assembly slidably disposed in said shaft, said platform assemblies being vertically clear of each other when one of said assemblies is in its vertically folded position, at least one of said platforms being spaced from an adjacent floor portion when in its horizontal position and a spanner unit including motive means on said platform for bridging said space.

11. A parking system as defined in claim 10 wherein said spanner unit includes a spanner tray slideably overlying said platform, runners slideably held by said platform and secured to said spanner tray, bracing means riding on said runners and extending transverse said spanner for strengthening the intermediate portion of the spanner.

12. A parking system as defined in claim 11 together with means for locating said bracing means at a point intermediate the ends of said spanner tray while in its extended position.

References Cited in the file of this patent

UNITED STATES PATENTS

| | | |
|---|---|---|
| 1,069,193 | Scofield | Aug. 5, 1913 |
| 1,275,983 | Rasmussen | Aug. 13, 1918 |
| 1,786,282 | Anderson | Dec. 23, 1930 |
| 1,969,419 | Martin | Aug. 7, 1934 |
| 2,430,319 | Zucker | Nov. 4, 1947 |
| 2,465,551 | Otterness | Mar. 29, 1949 |
| 2,528,790 | Scherer | Nov. 7, 1950 |
| 2,791,338 | Thaon de Saint-Andre | May 7, 1957 |
| 2,916,167 | Graham | Dec. 8, 1959 |
| 2,925,311 | Dull | Feb. 16, 1960 |